United States Patent
Shen et al.

(10) Patent No.: US 9,836,561 B2
(45) Date of Patent: Dec. 5, 2017

(54) OPTIMIZING MULTISTAGE HYDRAULIC FRACTURING DESIGN BASED ON THREE-DIMENSIONAL (3D) CONTINUUM DAMAGE MECHANICS

(71) Applicant: Landmark Graphics Corporation, Houston, TX (US)

(72) Inventors: Xinpu Shen, Houston, TX (US); William B. Standifird, Fulshear, TX (US); Scot Evans, Sugar Land, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 14/770,076

(22) PCT Filed: Aug. 28, 2014

(86) PCT No.: PCT/US2014/053171
§ 371 (c)(1),
(2) Date: Aug. 24, 2015

(87) PCT Pub. No.: WO2016/032489
PCT Pub. Date: Mar. 3, 2016

(65) Prior Publication Data
US 2017/0169137 A1    Jun. 15, 2017

(51) Int. Cl.
*G06F 17/50* (2006.01)
*G01V 1/28* (2006.01)
(Continued)

(52) U.S. Cl.
CPC ...... *G06F 17/5009* (2013.01); *E21B 41/0092* (2013.01); *E21B 43/26* (2013.01);
(Continued)

(58) Field of Classification Search
CPC . G06F 17/5009; G01V 1/282; E21B 41/0092; E21B 43/26; E21B 7/046; E21B 49/00
(Continued)

(56) References Cited

U.S. PATENT DOCUMENTS

| 2006/0015310 A1 | 1/2006 | Husen et al. |
| 2008/0091396 A1 | 4/2008 | Kennon et al. |

(Continued)

FOREIGN PATENT DOCUMENTS

CN    103902758 A    7/2014

OTHER PUBLICATIONS

B. Xu, R.C.K. Wong, "A 3D Finite Element Model for History Matching Hydraulic Fracturing in Unconsolidated Sands Formation" Journal of Canadian Petroleum Technology, Apr. 2010, vol. 49, No. 4, pp. 58-66.*

(Continued)

*Primary Examiner* — Dwin M Craig

(57) ABSTRACT

System and methods for optimizing multistage hydraulic fracturing design based on three-dimensional (3D) continuum damage mechanics are provided. A 3D global model of a field of hydrocarbon reservoirs is generated. A finite element analysis of the 3D global model is performed to calculate values of one or more mechanical variables for the field. A smaller-scale 3D sub-model of a selected portion of the field is generated from the 3D global model based on the calculated values of the mechanical variables. The hydraulic fracturing effects of fluid injection stimulation within the targeted reservoir formation are simulated by applying one or more numerical damage models to the sub-model. Optimal design parameters for multistage hydraulic fracturing of the targeted formation with a plurality of horizontal wells are determined based on numerical results of the simulation.

20 Claims, 13 Drawing Sheets

(51) Int. Cl.
    *E21B 43/26* (2006.01)
    *E21B 41/00* (2006.01)
    *E21B 49/00* (2006.01)
    *E21B 7/04* (2006.01)

(52) U.S. Cl.
    CPC ............. *G01V 1/282* (2013.01); *E21B 7/046* (2013.01); *E21B 49/00* (2013.01)

(58) Field of Classification Search
    USPC ......................................................... 703/10
    See application file for complete search history.

(56) References Cited

U.S. PATENT DOCUMENTS

| | | | |
|---|---|---|---|
| 2011/0125476 A1 | 5/2011 | Craig | |
| 2011/0166843 A1* | 7/2011 | Hsu | G01V 11/00 703/10 |
| 2012/0072188 A1* | 3/2012 | Maerten | G01V 99/005 703/2 |
| 2012/0185225 A1 | 7/2012 | Onda et al. | |
| 2013/0073268 A1* | 3/2013 | Abacioglu | E21B 41/0092 703/2 |

OTHER PUBLICATIONS

International Search Report and Written Opinion, dated May 22, 2015, 10 pages; Korean International Searching Authority.

M.Rafiee, M.Y. Soliman, and E. Pirayesh, Texas Tech University, Hydraulic Fracturing Design and Optimization: A Modification to Zipper Frac, Oct. 8-10, 2012, 16 Pages, SPE Annual Technical Conference and Exhibition held in San Antonio, Texas, USA, SPE 159786.

Mehdi Rafiee, M.Y. Soliman and Elias Pirayesh, Texas Tech University; Hamid Emami Meybodi, University of Calgary, Geomechanical Considerations in Hydraulic Fracturing Designs, 13 pages, Society of Petroleum Engineers, SPE 162637.

Bagherian, et al., "Optimization of Multiple-Fractured Horizontal Tight Gas Well," SPE International Symposium and Exhibition on Formation Damage Control, Lafayette, Louisiana, USA, Feb. 10-12, 2010.

Bahrami, et al., "A Numerical Investigation of Hydraulic Fracturing Process in Oil Reservoirs Using Non-Linear Fracture Mechanics," 5th Asian Rock Mechanics Symposium, Tehran, Iran. Nov. 24-26, 2008.

Christianovich, et al. "Theoretical Principles of Hydraulic Fracturing of Oil Strata," Proc. 5th World Petroleum Congress, Section 2, Paper 23, pp. 289-296, New York, Jun. 1959.

Cipolla, et al. "The Relationship Between Fracture Complexity, Reservoir Properties. And Fracture-Treatment Design," SPE Journal, pp. 438-452, Nov. 2010.

Cleary, "Comprehensive Design Formulae for Hydraulic Fracturing," SPE Annual Technical Conference and Exhibition, Dallas, Texas, USA, Sep. 21-24, 1980.

Ehlig-Economides, et al., "Pressure Transient and Production Data Analysis for Hydraulic Fracture Treatment Evaluation." SPE Russian Oil and Gas Technical Conference and Exhibition, Moscow, Russia, Oct. 3-6, 2006.

Lee, et al., "Plastic-Damage Concrete Model for Earthquake Analysis of Dams," Earthquake Engng. Struct. Dyn vol. 27, pp. 937-956, 1998.

Mayerhofer, et al., "What Is Stimulated: Reservoir Volume?" SPE Journal, pp. 89-98, Feb. 2010.

Nagel, et al., "Stress Shadow Evaluations for Completion Design in Unconventional Plays," SPE Unconventional Resources Conference, Calgary, Alberta, Canada, . Nov. 5-7, 2013.

Oeth, et al., "Acid Fracture Treatment Design with Three-Dimensional Simulation," SPE Hydraluc Fracturing Technology Conference, SPE 168602, The Woodlands, Texas, Feb. 4-6, 2014.

Rafiee, et al., Geomechanical Considerations in Hydraulic Fracturing Designs, SPE 162637, SPE Canadian Unconventional Resources Conference held in Calgary, Alberta, Canada, Oct. 30-Nov. 1, 2012.

Rafiee, et al., Hydraulic Fracturing Design and Optimization: A Modification to Zipper Frac, SPE 159786, SPE Annual Technical Conference and Exhibition, San Antonio, Texas, Oct. 8-10, 2012.

Shaoul, et al., "Damage Mechanisms in Unconventional-Gas-Well Stimulation—A New Look at an Old Problem," SPE Production & Operations, vol. 4, pp. 388-400, Nov. 2011.

Soliman, et al., "Geo-Mechanics Aspects of Multiple Fracturing of Horizontal and Vertical Wells," SPE International Thermal Operations and Heavy Oil Symposium and Western Regional Meeting, Bakersfield, California, USA, Mar. 16-18, 2004.

Swoboda, et al., "Damage Model for Jointed Rock Mass and its Application to Tunneling," Computer and Geotechnics, pp. 183-203, Mar. 11, 1998.

Warpinski, N. R., "Understanding Hydraulic Fracture Growth, Effectiveness, and Safety Through Microseismic Monitoring," Proceedings of the International Conference for Effective and Sustainable Hydraulic Fracturing. Brisbane, Australia, Chapter 6, pp. 123-135, May 2013.

Warpinski, N.R., "Measurement of Width and Pressure to a Propagating Hydraulic Fracture," SPE-11648-PA SPE Journal, pp. 48-54, Feb. 1985.

\* cited by examiner

OPTIMIZING MULTISTAGE HYDRAULIC FRACTURING DESIGN BASED ON THREE-DIMENSIONAL (3D) CONTINUUM DAMAGE MECHANICS

FIELD OF THE DISCLOSURE

The present disclosure relates generally to hydraulic fracturing for well stimulation and improving the production of subterranean hydrocarbon deposits, and more specifically to techniques for optimizing hydraulic fracturing design to further improve hydrocarbon production through well stimulation.

BACKGROUND

In the oil and gas industry, a well that is not producing as expected may need stimulation to increase the production of subsurface hydrocarbon deposits, such as oil and natural gas. Hydraulic fracturing has long been used as a major technique for well stimulation. The rapid development of unconventional resources in recent years has led to a renewed interest in hydraulic fracturing, and particularly multistage hydraulic fracturing. Examples of such unconventional resources include, but are not limited to, oil and/or natural gas trapped within tight sand, shale, or other type of impermeable rock formation. A multistage hydraulic fracturing operation may involve drilling a number of parallel horizontal wellbores and applying a series of stimulation injections along each wellbore in multiple stages. Two critical parameters affecting the success of a multistage hydraulic fracturing design are (1) the distance between the stages of a multistage horizontal well stimulation (or "stage interval") and (2) the distance between neighboring horizontal wells (or "well spacing"). A proper choice of values for each of these two parameters may have a significant impact on the extent to which production of an unconventional resource is increased during the multistage hydraulic fracturing operation.

Conventional approaches to stage interval design for multistage hydraulic fracturing are generally based on the analysis of fracture propagation through reservoir rock using a pseudo three-dimensional (3D) fracture model. For example, various software application tools are available for performing fracture simulation and analysis using 3D planar fracture models. The outputs of such fracture simulation tools mainly include the length and height of the 3D planar fracture. However, these tools provide very little information with respect to the lateral effects of the fracture propagation. Other approaches, such as the commonly known "stress shadow method," analyze the stress distribution around a particular facture or crack within a rock formation under a given fluid pressure at crack surfaces. However, this type of analysis fails to provide any useful information regarding fracture propagation under hydraulic fracturing. Therefore, this method does not provide accurate information about the effects of the fracture propagation. Accordingly, conventional approaches, such as the stress shadow method, provide only a rough approximation of stage interval values.

DESCRIPTION OF ILLUSTRATIVE EMBODIMENTS

Figure 1:
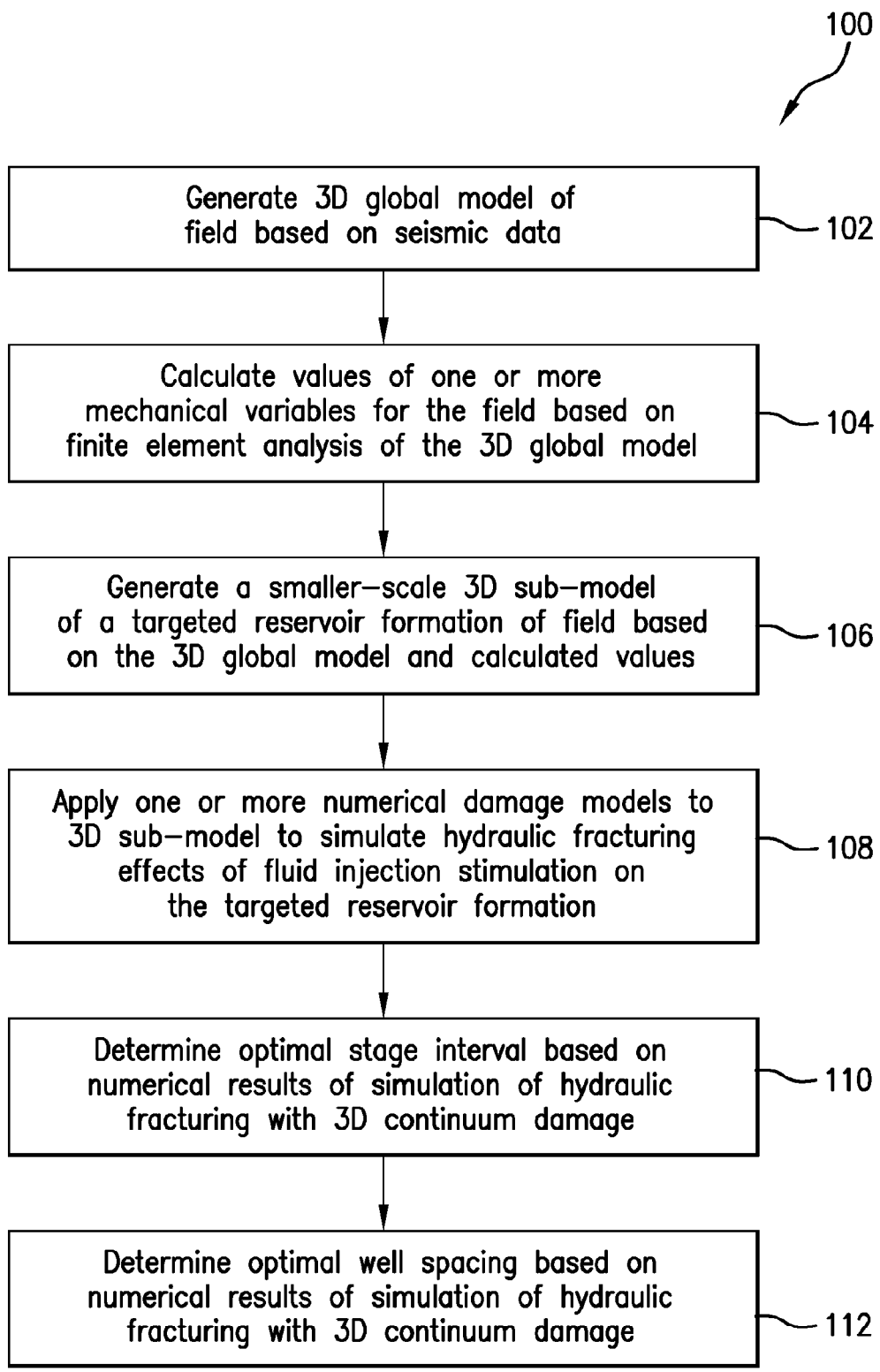
FIG. 1 is a process flowchart of an exemplary method for optimizing multistage hydraulic fracturing design based on three-dimensional (3D) fracture propagation models, according to an embodiment of the present disclosure.

Embodiments of the present disclosure relate to optimizing multistage hydraulic fracturing design based on 3D continuum damage mechanics. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As will be described in further detail below, embodiments of the present disclosure utilize principles of continuum damage mechanics to model fracture propagation under fluid injection stimulation in 3D space. The term "mechanical variable" is used herein to refer one or more mechanical properties of a rock formation that may affect various directional stresses within the formation. Examples of such mechanical properties that may be represented by a mechanical variable include, but are not limited to, a geo-stress distribution, a pore pressure distribution, and a displacement distribution across one or more external surfaces of the formation. The terms "continuum damage variable" and "damage variable" are used interchangeably herein to refer to a numerical index or value that represents a measure of the material continuity of a rock formation. In rock mechanics, the material continuity may vary over a range of values, for example, from a value of zero for intact rock to a value of one for completely separated or broken rock. Using such rock mechanics principles, the volumetric density of cracks created by the injection of fluid during the stimulation process can be represented by a set of scalar damage variables. Such damage variables can be used to model fracture propagation in different directions within a 3D volume of a reservoir rock formation. Thus, embodiments of the present disclosure can be used to generate a real-world 3D model of a petroleum reservoir. Such a real-world 3D model can be used to simulate fracture propagation in not only the vertical and transverse directions, but also in the lateral direction. This allows for a full 3D analysis of fracture propagation within a real-world environment. Accordingly, the present disclosure enables reservoir engineers to find optimized design solutions for the spacing or interval between different stages of a multistage hydraulic fracturing process in addition to the spacing between neighboring horizontal wells.

Illustrative embodiments and related methodologies of the present disclosure are described below in reference to FIGS. 1-12 as they might be employed, for example, in a computer system for generating 3D graphical models of a reservoir of subsurface hydrocarbon deposits, such as oil and natural gas. An example of such a computer system will be described below in reference to FIG. 13. Also, as will be described in further detail below, the computer-generated 3D models may include, for example, graphical representations of a petroleum field at different scales, e.g., a "3D global model" at the scale of the field as a whole or a smaller-scale model (or "3D sub-model") of a portion of the field. The portion of the field represented by the 3D sub-model may correspond to, for example, a formation of at least one of the field's hydrocarbon reservoirs. Further, various finite element analysis techniques may be employed in combination with the 3D models to numerically simulate fracture propagation based on continuum damage mechanics under fluid injection stimulation. It should be appreciated that any of various well-known fluid types or formulations may be selected as the injection fluid to be used for stimulation. The selected fluid may be based on, for example, the properties of the particular reservoir or the type of rock formation under stimulation.

FIG. 1 is a process flow diagram of an exemplary method 100 for optimizing multistage hydraulic fracturing design based on 3D continuum damage mechanics. As will be described in further detail below, method 100 may be used to determine optimal design parameters for multistage hydraulic fracturing of a petroleum field. In an embodiment, method 100 includes steps 102, 104, 106, 108, 110, and 112. It should be noted that some of these steps may be performed concurrently or in a different order than that shown in FIG. 1. It should also be noted that method 100 may include additional steps than those shown in FIG. 1 for implementing the hydraulic fracturing design optimization techniques disclosed herein.

As shown in FIG. 1, method 100 begins in step 102, which includes generating a graphical 3D global model of the petroleum field based on subsurface data captured for the field. The field in this example may include one or more reservoirs of hydrocarbon deposits including, but not limited to, oil and natural gas. The hydrocarbon deposits may be, for example, unconventional petroleum resources including, but not limited to, oil and natural gas trapped within tight sand, shale, or other type of rock formation with relatively low permeability. The subsurface data for the field may include, for example, subsurface geophysical data captured for purposes of hydrocarbon exploration and recovery. Such data may be derived from various sources including, but not limited to, well logs, core samples, and seismic-data traces. In an embodiment, the subsurface data may include microseismic data obtained from the stimulation of one or more offset wells drilled for the field. The microseismic data may be used, for example, to derive information related to the material properties and subsurface structures located within various stratigraphic layers of the field.

In an embodiment, the generated 3D global model may comprise a mesh of 3D finite elements representing different geometries of the subsurface features of the field or formation being modeled. It should be appreciated that any of various 3D finite element modeling tools, including commercially available finite element modeling software programs, may be used to generate the 3D global model. Such a modeling program may include, for example, a library of predefined elements that may be used to model various physical geometries and structures of a rock formation.

In step 104, values of one or more mechanical variables for the field are calculated based on a finite element analysis of the generated 3D global model. As described above, the one or more mechanical variables may represent, for example and without limitation, a geo-stress distribution, a pore pressure distribution, and a displacement distribution across one or more external surfaces of the 3D global model. The one or more external surfaces of the 3D global model may include, for example, a bottom surface and one or more lateral surfaces of the 3D global model.

In step 106, a smaller-scale 3D sub-model of a selected portion of the field is generated based on the 3D global model generated in step 102 and the values of the one or more mechanical variables calculated in step 104. The selected portion of the field corresponds to, for example, a formation of at least one of the field's hydrocarbon reservoirs that is targeted for multistage hydraulic fracturing through fluid injection stimulation. Thus, while the scale of 3D global model generated in step 102 may be measured in kilometers (e.g., 10 kilometers), the scale of the 3D sub-model may be in meters (e.g., 400 meters).

In step 108, one or more numerical damage models are applied to the generated 3D sub-model to simulate the hydraulic fracturing effects of the fluid injection stimulation within the targeted reservoir formation of the field. In an embodiment, the numerical damage models applied to the 3D sub-model may include, for example and without limitation, a plasticity-based continuum damage model and a coupled poro-elastoplastic finite element model applied to the 3D sub-model at different levels. The plasticity-based continuum damage model may be applied to the 3D sub-model to stimulate the hydraulic fracturing effects at, for example, a material level of the targeted reservoir formation. The coupled poro-elastoplastic finite element model may be applied to the 3D sub-model to simulate the hydraulic fracturing effects at, a structural level of the targeted reservoir formation as a whole. In a further embodiment, the values of the mechanical variables calculated using the 3D global model are applied to the 3D sub-model as a set of boundary and initial conditions for simulating the hydraulic fracturing effects of the fluid injection stimulation within the targeted reservoir formation. As the simulation in this example uses continuum damage mechanics principles to simulate fracture propagation behavior due to fluid injection stimulation within a 3D volume of the 3D sub-model, the hydraulic fracturing effects may be simulated in vertical, transverse, and horizontal directions. Thus, advantages of method 100 include providing a way to analyze fracture propagation using continuum damage mechanics in full 3D space.

The numerical results of the simulation performed in step 108 are then used in steps 110 and 112 to determine optimal design parameters for multistage hydraulic fracturing of the targeted reservoir formation with a plurality of horizontal wells. In an embodiment, the plurality of horizontal wells may be drilled using a zipper frac technique involving two or more parallel horizontal wells that are drilled in the field and perforated at alternate intervals along the well bores and fractured at the perforations. Multistage hydraulic fracturing using such a zipper frac technique may include performing a multistage stimulation at different fluid injection points along each of the individual horizontal wells. Such a technique may create a network of fractures, e.g., within different fracture propagation zones, between the wells that increases production in both wells. The critical parameters in a zipper frac design may include, for example, the stage interval between successive stages of the multistage stimulation and the well spacing between the two or more parallel horizontal wells.

Thus, as shown in FIG. 1, method 100 includes determining an optimal stage interval and an optimal well spacing in steps 110 and 112, respectively. The optimal values for these design parameters may be determined based on the numerical results of the simulation performed in step 108. The numerical results of the simulation may include, for example, continuum damage distribution values that are calculated based on the set of boundary and initial conditions applied to the 3D sub-model, as described above. The continuum damage distribution values in this example may represent, for example, the results of numerically simulating the hydraulic fracturing effects and fracture propagation behavior due to fluid injection stimulation within the targeted reservoir formation based on 3D continuum damage mechanics.

In an embodiment, the optimal stage interval and the optimal well spacing are determined in steps 110 and 112, respectively, based on the critical value of a synthetic continuum damage variable (also referred to herein as a "synthetic damage variable") of the targeted reservoir formation. The synthetic continuum damage variable may represent, for example, the hydraulic fracturing effects resulting from compressive and tensile stresses under the fluid injection stimulation, as will be described in further detail below. The critical value may represent, for example, a value of the synthetic continuum damage variable that is sufficient to form an effective fracture. A fracture may be considered effective if, for example, the size of the fracture's opening is large enough to hold a sufficient amount of a propping agent used in the fluid injection stimulation and thus contribute to the production of hydrocarbons. Thus, an effective fracture may have an opening of at least a predetermined size for holding a sufficient quantity of the propping agent used in the fluid injection stimulation of the targeted reservoir formation. Fractures with relatively larger openings usually will have relatively higher production capacities. However, the opening of a fracture generated by stimulation injection generally decreases in size as it propagates from the injection point (or heel of the fracture) to the front tip of the fracture (or its toe). As used herein, the term "fracture" may refer to one or more fractures within a network of fractures that propagate in different directions within a fracture propagation zone. In an embodiment, the critical value of the synthetic damage variable may be determined based on information derived from the microseismic data captured using the offset wells for the field.

As will be described in further detail below, the effective fracture may be formed within, for example, a zone of fracture propagation under the fluid injection stimulation. Such a fracture propagation zone may be associated with one or more of the fluid injection points or stages of the multistage stimulation performed along each parallel horizontal well using the aforementioned zipper frac technique. In an embodiment, the optimal stage interval may be determined in step 110 based on a distance of fracture propagation along a first path between a fluid injection point and a point on the first path corresponding to half of the critical value of the synthetic continuum damage variable. The first path may be in an axial direction relative to the trajectory of the zipper frac wells. In a further embodiment, the optimal well spacing may be determined in step 112 based on a distance of fracture propagation along a second path that is perpendicular to the first path (and well trajectory) and that is between the fluid injection point and a point on the second path corresponding to half of the critical value.

It should be appreciated that the steps of method 100 may be performed by any type of computing device having at least one processor and a memory for storing instructions that the process may read and execute to perform a plurality of functions for implementing the steps of method 100, as described above. Examples of such a computing device include, but are not limited to, a server, a desktop computer, a laptop computer, a tablet or other handheld computer, a personal digital assistant (PDA), a cellular telephone, a network appliance, a smart phone, a media player, a navigation device, a game console, or a combination of any these computing devices or other computing devices. In some implementations, method 100 may be performed by a distributed-computing environment or server farm in which the steps of method 100 may be performed by multiple processing devices with shared or separate memory components that are linked through a communications network. In such a distributed-computing environment, program modules may be located in both local and remote computer-storage media including memory storage devices. The present disclosure therefore may be implemented using various hardware devices, software, or a combination thereof.

Figure 2:
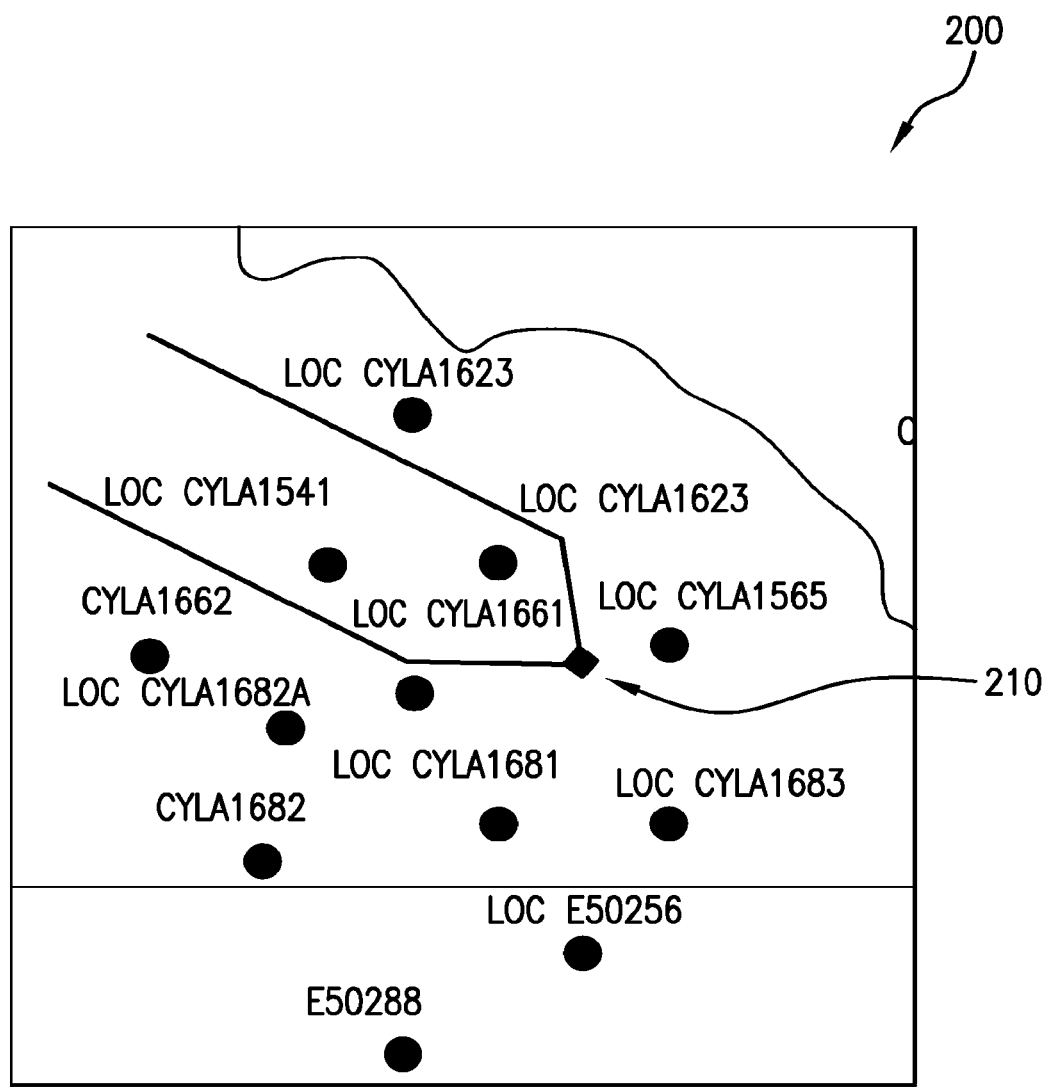
FIG. 2 illustrates a view of an exemplary field of hydrocarbon reservoirs targeted for multistage hydraulic fracturing.

To help further describe embodiments of the present disclosure, the examples depicted in FIGS. 2-12 will be used to demonstrate a practical application of method 100 of FIG. 1, as described above. As described above, method 100 may be used to determine optimal design parameters for multistage hydraulic fracturing of a petroleum field. An example of such a petroleum field is illustrated in FIG. 2. FIG. 2 shows a view of an exemplary petroleum field 200 including one or more reservoirs of hydrocarbon deposits. For example, multiple vertical and inclined wells for developing such hydrocarbon deposits may have been previously drilled at various geographic locations throughout field 200, as represented by the dark circular regions shown in FIG. 2. Although the wells in this example may have been hydraulically fractured to increase production, there still may be substantial quantities of hydrocarbon deposits that have yet to be produced. Accordingly, multistage hydraulic fracturing may be used to further stimulate production and unlock additional quantities of the trapped hydrocarbon deposits within field 200.

As shown in FIG. 2, the multistage hydraulic fracturing of field 200 may involve drilling a set of parallel horizontal wells 210. While only two horizontal wells are shown in FIG. 2, it should be noted that additional wells may be used, as desired for a particular implementation. In some implementations, the parallel horizontal wells 210 may be drilled using a zipper frac technique, as described above. Also, as described above, the critical design parameters in such a multistage hydraulic fracturing design may include, for example, the stage interval between successive stages of the multistage stimulation in addition to the well spacing between the two or more parallel horizontal wells. Optimal values for these two design parameters may increase the chances of a successful hydraulic fracturing operation by maximizing the amount of hydrocarbon production from field 200.

As described above, the disclosed techniques may be used to determine optimized stage interval and well spacing design parameters by utilizing continuum damage mechanics principles to model fracture propagation under fluid injection stimulation. In particular, the development of the fracture as a result of hydraulic fracturing may be simulated in all directions of a 3D volume representing a portion of field 200. The 3D volume may correspond to, for example, a formation of at least one of the field's hydrocarbon reservoirs that is targeted for fluid injection stimulation through multistage hydraulic fracturing. In an embodiment, the simulation involves performing a numerical stress analysis at field scale. Accordingly, a graphical 3D model of field 200 may be generated for this purpose. As the scale of the generated 3D model corresponds to the size of the field as a whole, it is referred to herein as a "3D global model."

Figure 3:
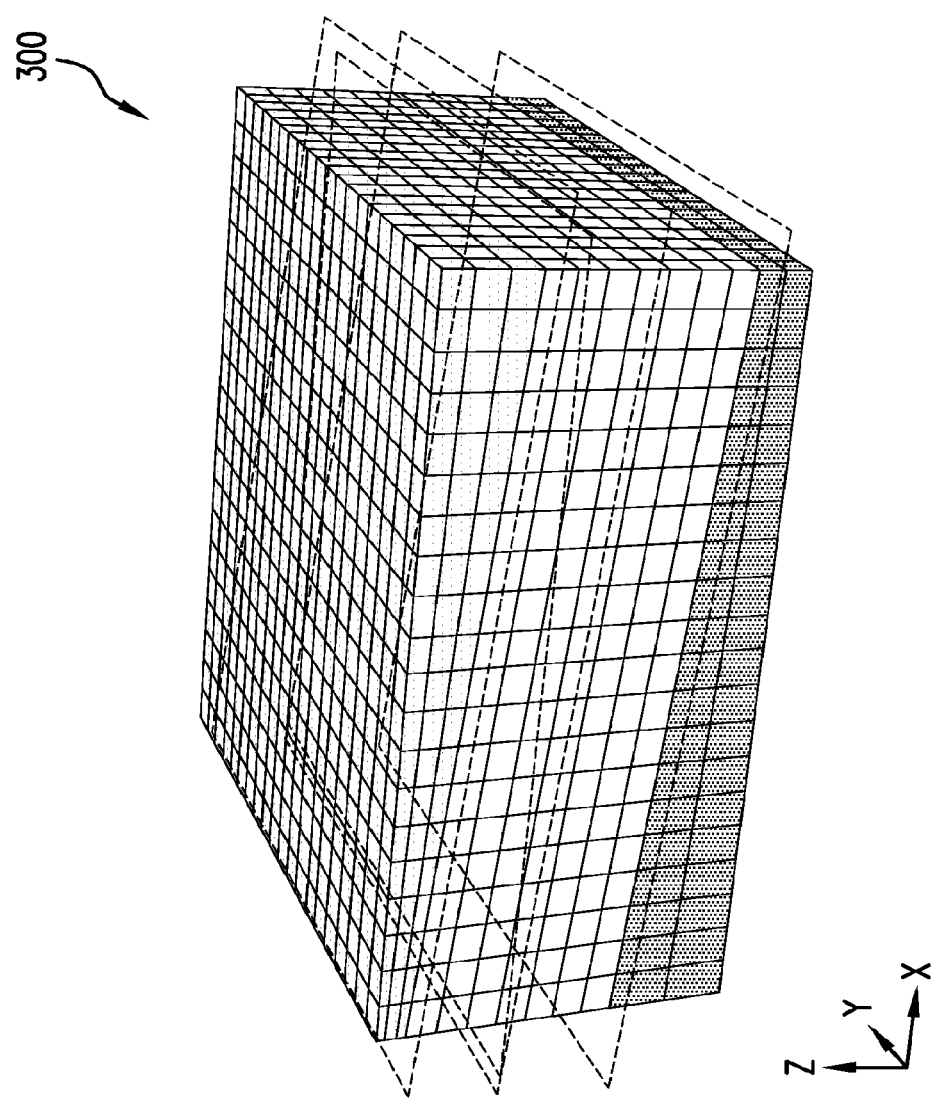
FIG. 3 illustrates an exemplary three-dimensional (3D) graphical model of the petroleum field of FIG. 2.
Figure 3:
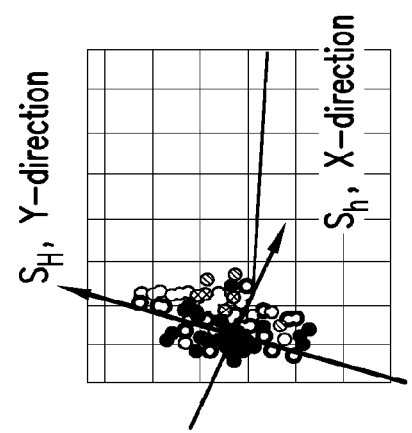

FIG. 3 illustrates an example of a 3D global model 300 of field 200. 3D global model 300 may be, for example, a 3D finite element model that can be used to obtain the geo-stress distribution of field 200. In the example shown in FIG. 3, the geometry of 3D global model 300 and its XYZ coordinate directions within 3D space may be defined by, for example, a set of geo-mechanical factors related to the field being modeled. Such factors may include, for example and without limitation, the direction and angle of maximum or principal stress within the model, the scale of the model, the location of the wellbore to be drilled for injection stimulation, and the inclination angle of one or more rock formation layers represented by the model. For discussion purposes only, it is assumed that the following values for each of the above-listed factors were adopted in the definition of model 300: the direction of the maximum/principal stress is set to be the Y-direction of model 300 and at an angle of +14° relative to true north; the scale of model 300 is set to have a length and width of 10 kilometers each with a thickness or depth of 6 kilometers; the location of the wellbore (or top of the wellbore) is set to be in the center of model 300; and the inclination angle of the sediment layer(s) of the field formation represented by model 300 is set to 6.5°.

In an embodiment, a set of boundary conditions are applied to model 300 for the numerical analysis that is performed at field scale. It is assumed for purposes of this example, it is assumed that such boundary conditions may be based on the following characteristics with respect to the geometry of model 300: displacement constraints are applied in an outward direction that is normal to each of the lateral surfaces and the bottom surface of model 300; and for simplification, the top surface of model 300 is set as a free surface for which any variations in elevation are ignored.

Figure 4:
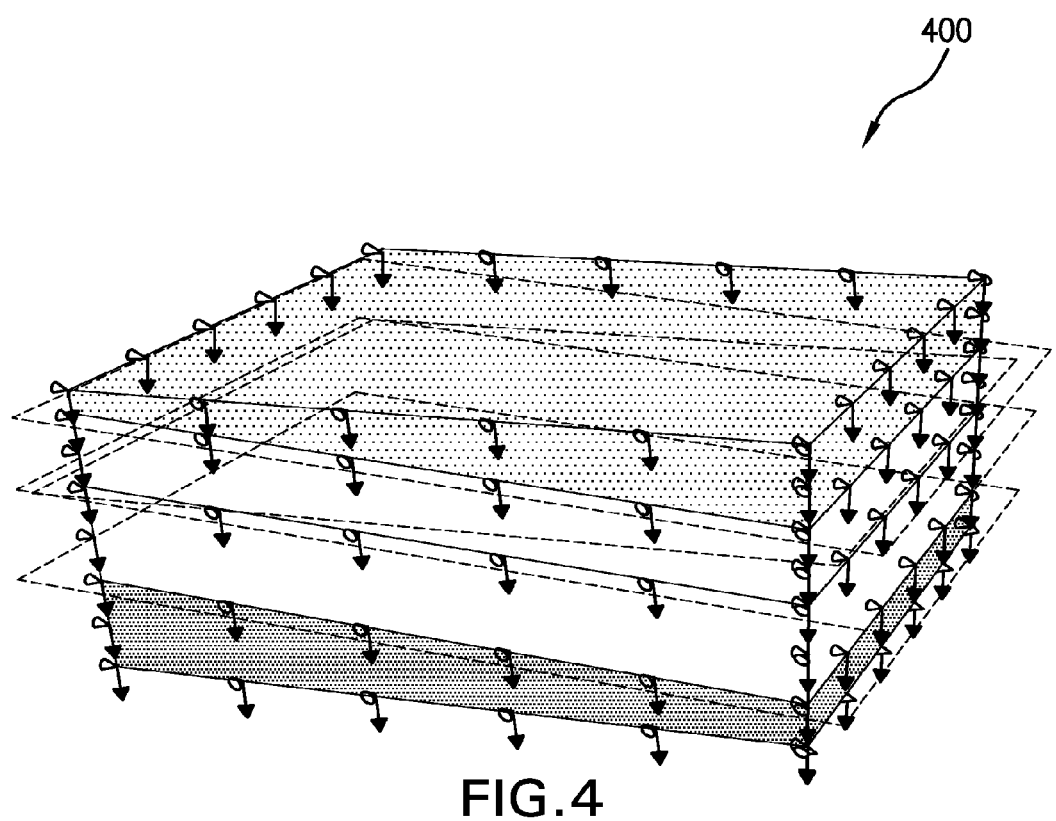
FIG. 4 shows an exemplary visualization of the boundary conditions and directions of the gravity load that may be applied to the 3D petroleum field model (or "3D global model") of FIG. 3.

In addition to the boundary conditions, a set of initial conditions may be applied to the 3D field model for performing the numerical analysis. Thus, it is further assumed for purposes of this example that the following initial conditions are applied to 3D global model 300: an initial geo-stress field that is applied with an effective stress ratio ("k0") of 0.6 in addition to a tectonic factor ("tf") of 0.5; and an initial pore pressure of 3000 psi that may be applied to the reservoir formations. Additionally, a gravity load may be applied to model 300. FIG. 4 shows an exemplary visualization 400 of the boundary conditions and directions of the gravity load that may be applied to model 300. The gravity load may be used, for example, to balance the initial geo-stress field with any existing pore pressure. Thus, the above values for the effective stress ratio and tectonic factor of the initial geo-stress field may be initial values that may be balanced with the gravity load of the formations. The initial values may be automatically adjusted using, for example, one or more equilibrium equations that account for the gravity load. For example, a finite element modeling program may be used to perform an iterative analysis of the geo-stress field in equilibrium based on the initial geo-stress values described above. This analysis may include, for example, performing an iterative calculation of the stress field that starts with the initial values and continues until the stress field reaches a state of equilibrium under given gravity loads, pore pressure, and initial geo-stress values. The results of the field-scale numerical analysis performed using the above-described boundary and initial conditions may include, for example, the directions and values of the principal stresses within 3D global model 300 of FIG. 3. In an embodiment, the numerical analysis may include calculating the values of one or more mechanical variables based on a finite element analysis of 3D global model 300.

Figure 5A:
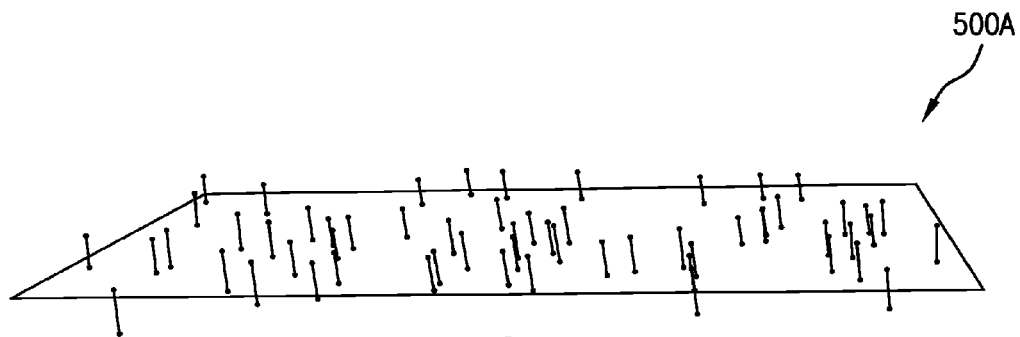
FIGS. 5A-5C show exemplary visualizations of the principal directional stresses at various points across a two-dimensional section of the 3D global model of FIG. 3.
Figure 5B:
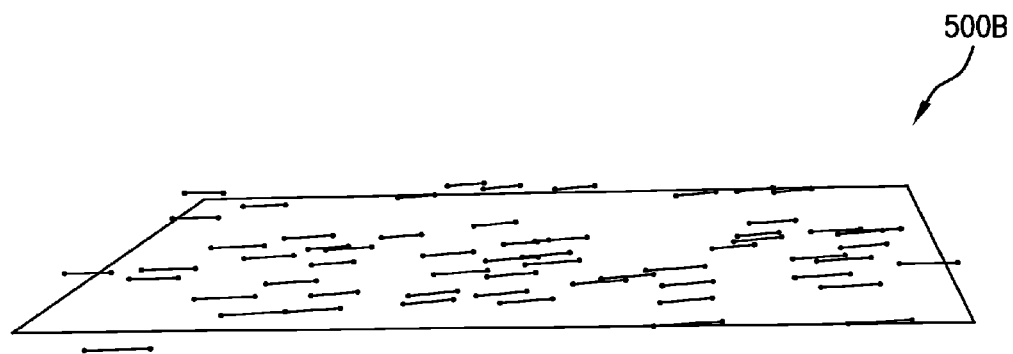
Figure 5C:
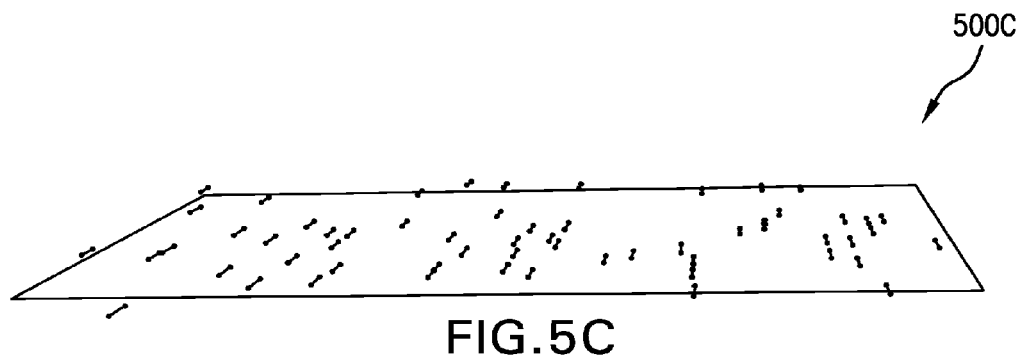

FIGS. 5A-5C show exemplary visualizations of the principal directional stresses within 3D global model 300 of FIG. 3, based on the values calculated for different mechanical variables. In each of the examples shown in FIGS. 5A-5C, a two-dimensional (2D) planar view of the visualized values for a different type of compressive stress at various points within model 300. The 2D plane corresponding to each view may represent, for example, a 2D cross-section of 3D global model 300 in the X and Y directions. The visualized directional stresses in each view may represent, for example, the value of a mechanical variable at a true vertical depth (TVD) measured for field 200 relative to the location of the wellbore. The mechanical variable represented by the visualization shown in view 500A of FIG. 5A may be, for example, the maximum compressive stress at a particular TVD (e.g., 1,700 meters). Similarly, the visualization in view 500B of FIG. 5B may be for the minimum compressive stress, and the visualization in view 500C of FIG. 5C may be for the medium compressive stress.

Figure 6:
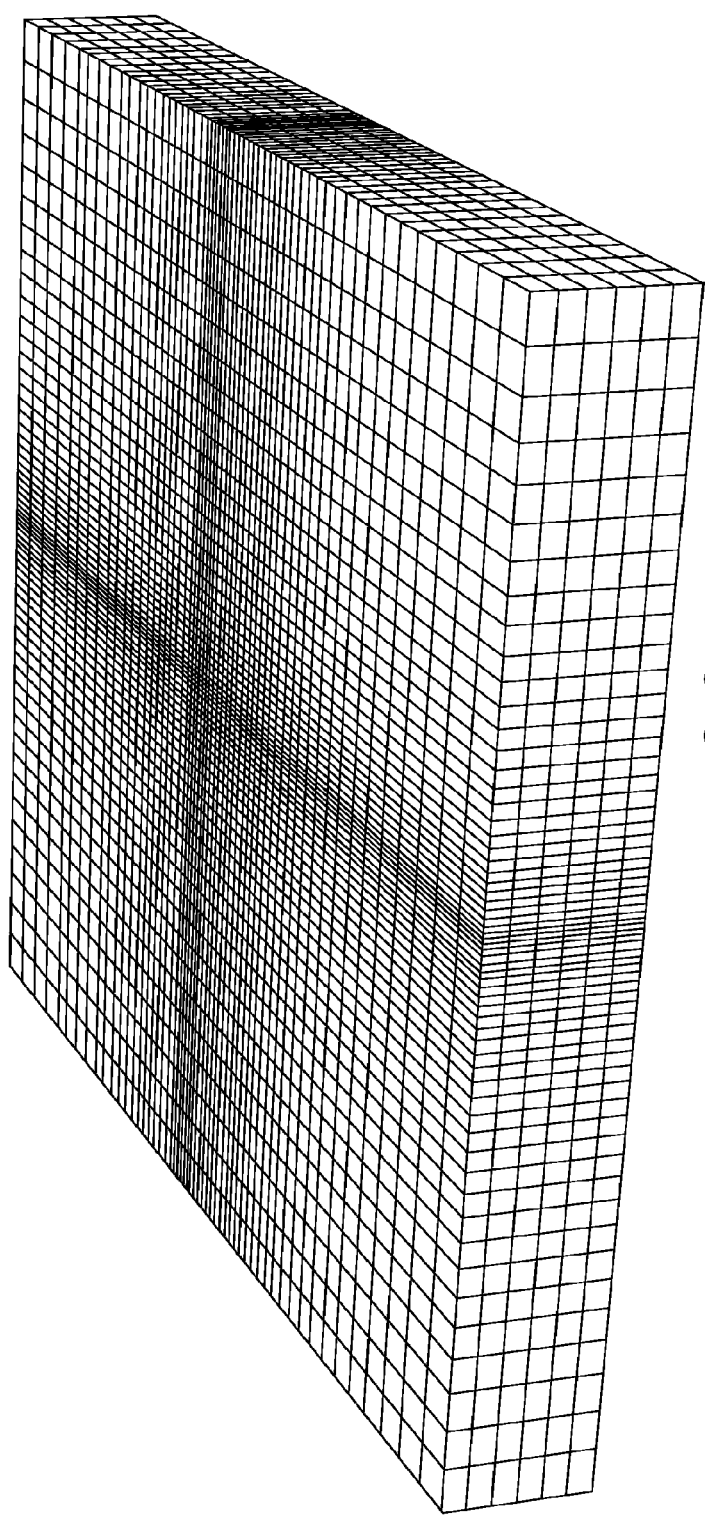
FIG. 6 illustrates an exemplary smaller scale 3D graphical model (or "3D sub-model") whose boundary conditions are derived from a numerical analysis of the 3D global model of FIG. 3.

As described above, the calculated values of the mechanical variables may be used to generate a smaller scale 3D sub-model corresponding to, for example, a formation of at least one of the field's hydrocarbon reservoirs. FIG. 6 illustrates an example of such a 3D sub-model 600, which may be generated based on the 3D global model 300 of FIG. 3. In an embodiment, 3D sub-model 600 may be generated using various sub-modeling techniques that accommodate for the field-to-reservoir or field-to-borehole-section scale discrepancy between the two models. Such techniques also may be used to derive appropriate boundary conditions for the smaller scale 3D sub-model 600 from the larger scale 3D global model 300. In this way, the hierarchical levels of the sub-model are not limited. This approach also allows for a highly inclusive field-scale analysis (using the 3D global model) to be linked to a very detail stress analysis (using the 3D sub-model) at a much smaller scale. The benefits of such an approach are bidirectional, with both larger scale and smaller scale simulations benefiting from the linkage.

In the example shown in FIG. 6, it is assumed that the geometry of 3D sub-model 600 is based on a scale in which the width and length are each set to 200 meters and the depth or thickness is set to 20 meters. The 3D sub-model 600 in this example may be used to simulate the hydraulic fracturing effects of fluid injection stimulation within a 3D volume. In contrast with the analysis performed using 3D global model 300, the simulation and analysis using 3D sub-model 600 is focused on the lateral scope of the fractured volume generated by fluid injection. Accordingly, the analysis of the mechanical behavior of fracture propagation in the vertical direction can be simplified by limiting the geometry of 3D sub-model 600 to just a portion (e.g., a relatively thin slice) of the 3D global model 300. In some implementations, the geometry of 3D sub-model 600 may be based on a finite element mesh generated using a finite element modeling program, as described previously. The modeling program may be used, for example, to form the finite element mesh by discretizing the sub-model with tens of thousands (e.g., 22,000) of multi-node continuum elements.

It is assumed for purposes of this example that the above-described analysis will simulate fracture generation under a bottom-hole pressure ("Btmh") of 5,730 psi after initial peak value, a perforation section length of 10 meters, and an initial pore pressure for the reservoir of 3,000 psi. In an embodiment, the boundary conditions applied to 3D sub-model 600 for displacement and pore pressure may be based on the numerical results of the analysis using 3D global model 300, as described above. Similarly, the initial geo-stress values for 3D sub-model 600 also may be based on the numerical results of the analysis using 3D global model 300. These initial values may correspond to the geo-stress values at a particular TVD (e.g., 1,700 meters), as described above.

Figure 7B:
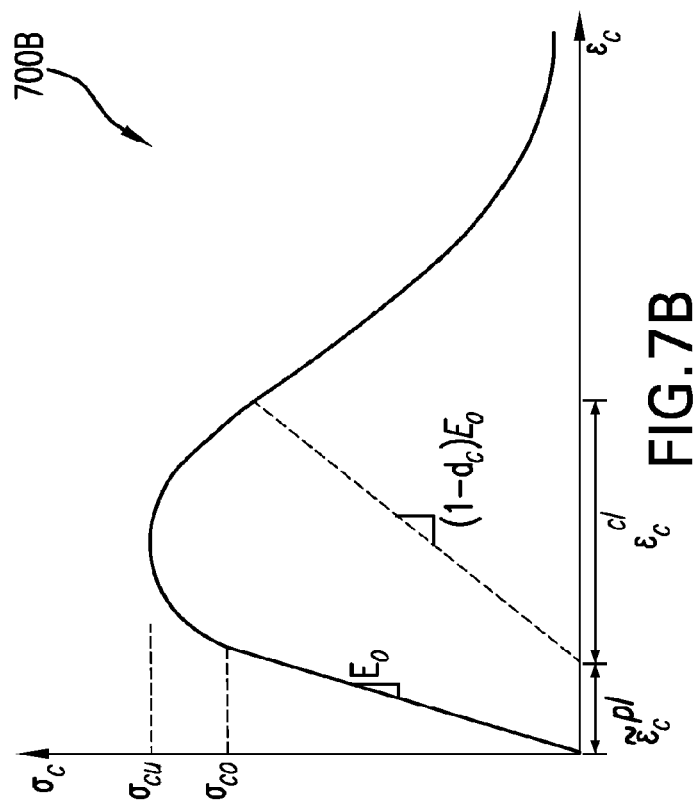
FIGS. 7A and 7B are graphs illustrating an exemplary uniaxial stress-strain behavior of the formation material represented by the 3D sub-model under tension and compression, respectively.
Figure 7A:
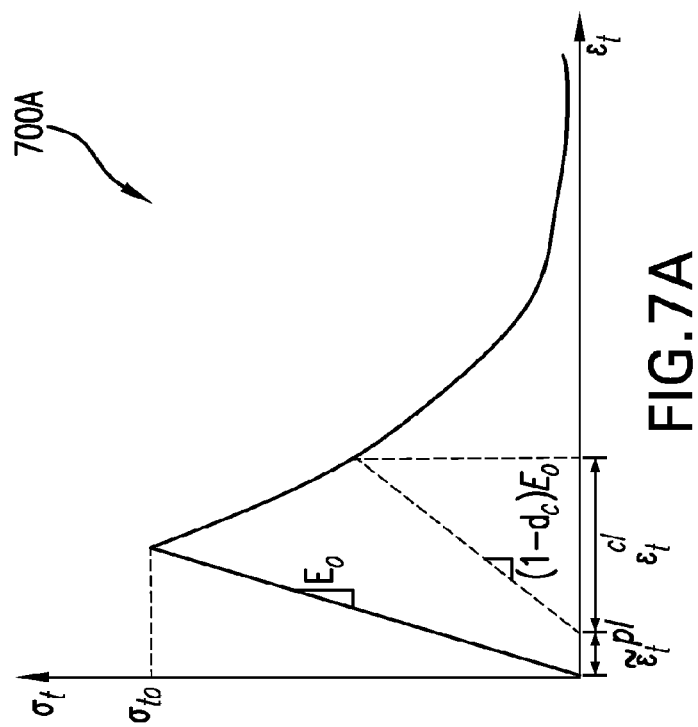

In an embodiment, the damage model used in the simulation for modeling fracture development in 3D sub-model 600 is a plasticity-based scalar continuum damage model. The mechanism for the damage evolution in this model includes two aspects: (1) damage resulting from tensile cracking; and (2) damage resulting from compressive crushing. The evolution of plastic loading may be controlled by a plurality of hardening parameters. Such hardening parameters may include, for example, the equivalent plastic strain $\bar{\epsilon}_t^{pl}$ caused by tensile load, and the part $\bar{\epsilon}_c^{pl}$, which is caused by compressive load. FIG. 7A is an exemplary graph 700A that shows the linear elastic behavior of the targeted formation material before the stress reaches a threshold tension value $\sigma_{t_0}$. A microcrack, which is modeled as a scalar damage variable, will begin as the stress values exceed the point of $\sigma_{t_0}$. Strain-softening phenomenon due to damage evolution may cause strain localization to the structure. FIG. 7B is an exemplary graph 700B that shows the compressive behavior of the material during the simulation. As illustrated in graph 700B, the material also shows linear elastic behavior before the stress reaches a threshold compression value $\sigma_{c0}$. The microcrack or material damage will begin as the stress values exceed the point of $\sigma_{c_0}$. Strain-hardening appears and will last until the stress level reaches $\sigma_{cu}$. As the stress level exceeds the point of $\sigma_{cu}$, the strain-softening phenomenon appears as a result of damage evolution, and may cause strain localization to the structure.

Figure 8A:
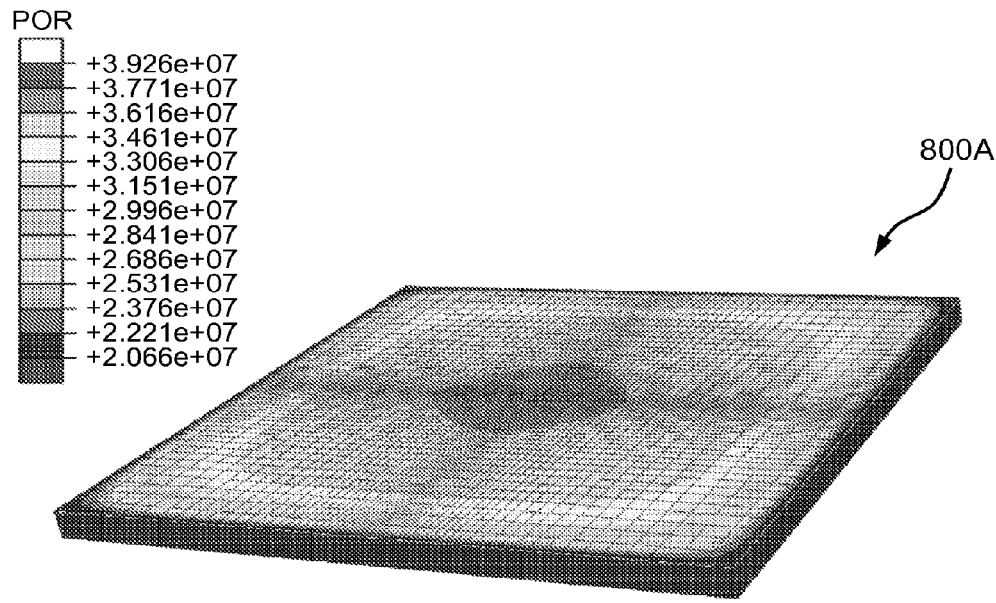
FIG. 8A illustrates an exemplary pore pressure distribution within the 3D sub-model based on a numerical simulation of injection stimulation applied to the sub-model.
Figure 8B:
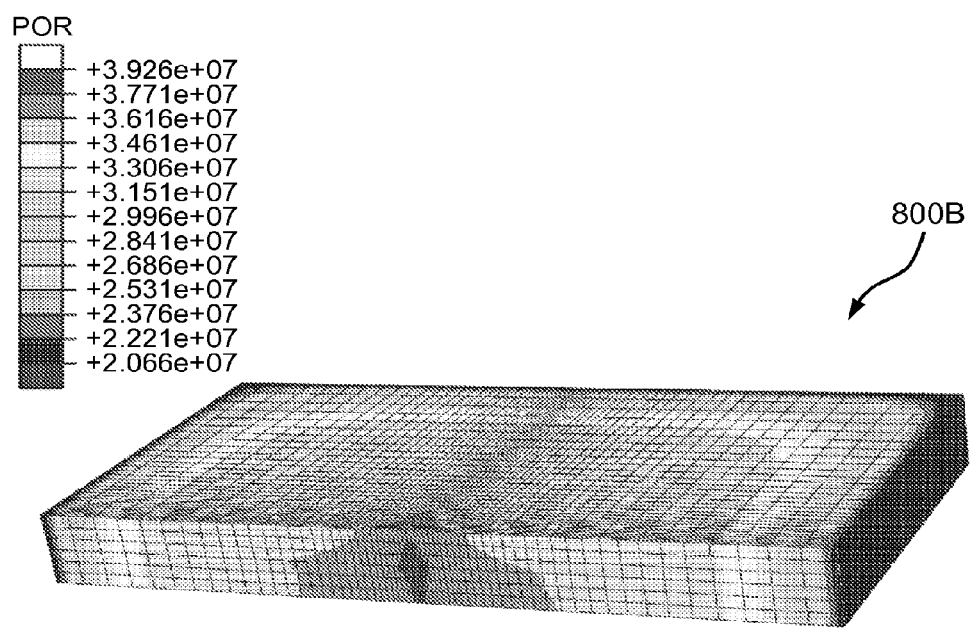
FIG. 8B illustrates a sectional view of the pore pressure distribution within the 3D sub-model illustrated in FIG. 8A.

In an embodiment, 3D sub-model 600 may be used to numerically simulate the fluid injection stimulation process. The numerical results of the simulation may include the pore pressure distribution as well as the distribution of damage variable during and after stimulation. FIGS. 8A and 8B illustrate an exemplary pore pressure distribution within 3D sub-model 600 after and during fluid injection stimulation. As shown in FIG. 8A, a view 800A of a cross-section of 3D sub-model 600 illustrates the pore pressure distribution in the X-Y plane relative a fluid injection point corresponding to the center of the sub-model. The results of the simulation may be used to determine a stable injection pressure at bottom hole corresponding to a given injection flow rate. For the injection flow in the example below, the corresponding stable injection pressure is at the level of approximately 39.5 MPa (5,730 psi). FIG. 8B illustrates a center sectional view 800B of 3D sub-model 600, which shows the pore pressure distribution in the X-Z plane during a stable injection stimulation process.

Figure 9:
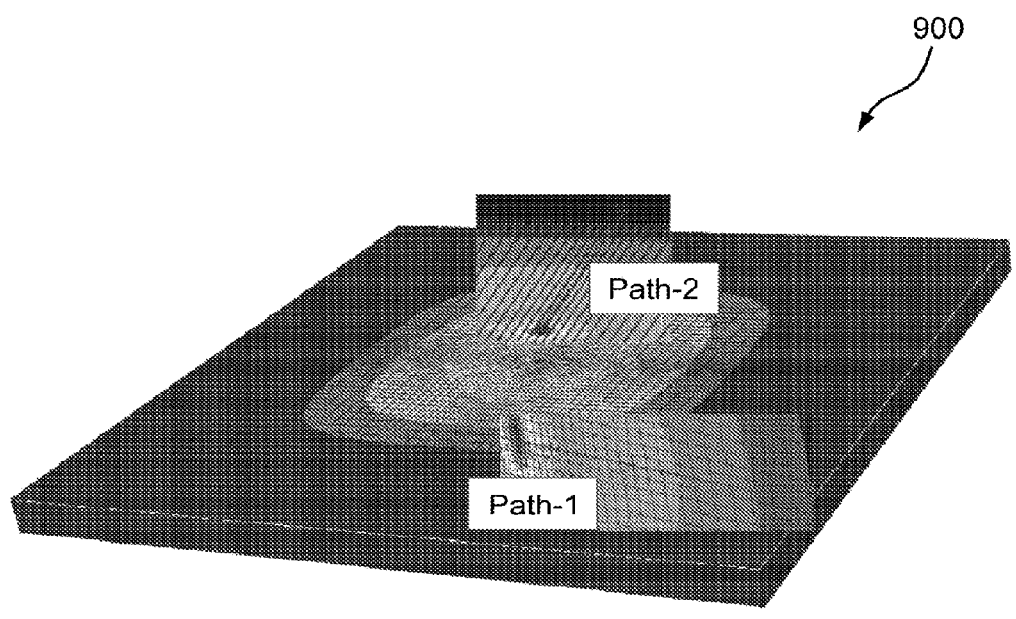
FIG. 9 illustrates a sectional view of the 3D sub-model for determining the continuum damage distribution along different paths originating from a fluid injection point at the center of the sub-model.

FIG. 9 is a sectional view 900 of 3D sub-model 600 illustrating an exemplary continuum damage distribution in the X-Y plane. As will be described in further detail below, the continuum damage distribution within 3D sub-model 600 may be determined based on values of a synthetic damage variable calculated at different points within the sub-model. Each point may correspond to, for example, a different node of the finite element mesh of 3D sub-model 600, as described above. Also, as described above, the synthetic damage variable may represent, for example, a combination of continuum damage variables including, but not limited to, a tensile damage variable and a compressive or crushing damage variable. In an embodiment, values of the synthetic damage variable may be calculated at each of the points or nodes of 3D sub-model 600 and also, may be analyzed at selected points along different paths of fracture propagation originating from the fluid injection point at the center of the sub-model. As shown in FIG. 9, a Path-1 extending in the X direction of the X-Y plane and a Path-2 extending in the Y direction may be selected for this purpose. Path-1 may be, for example, a first path extending in an axial direction relative to the trajectory of the above-described parallel horizontal wells 210 of FIG. 2. Path-2 in this example may be a second path extending in a perpendicular direction relative to the first path (and the trajectory of parallel horizontal wells 210).

Figure 10A:
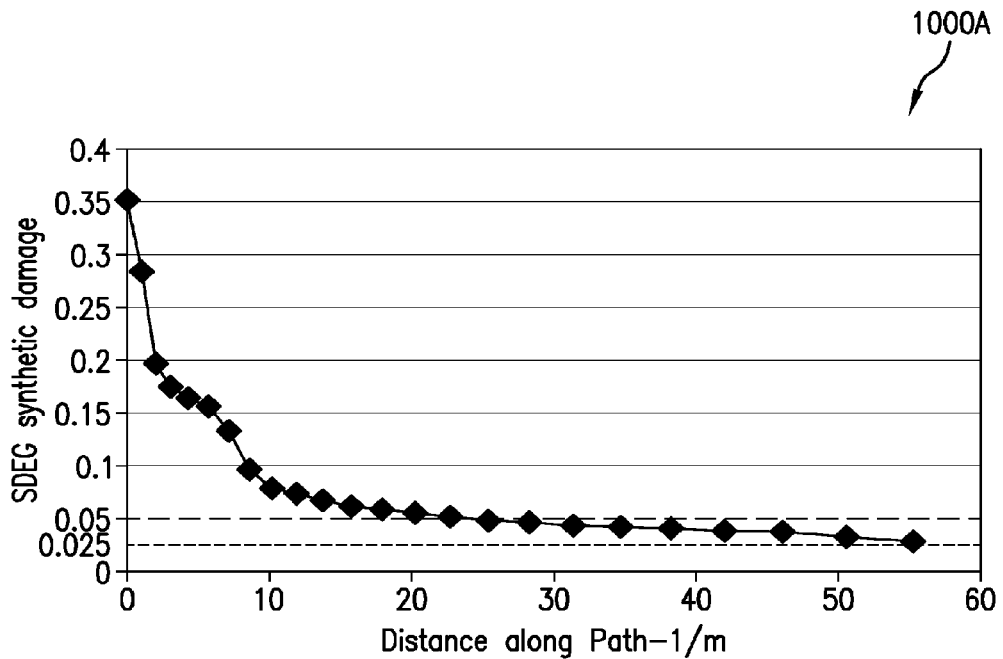
FIGS. 10A and 10B are graphs illustrating exemplary distributions of a synthetic damage variable for factures along the respective paths shown in the sectional 3D sub-model view of FIG. 9.
Figure 10B:
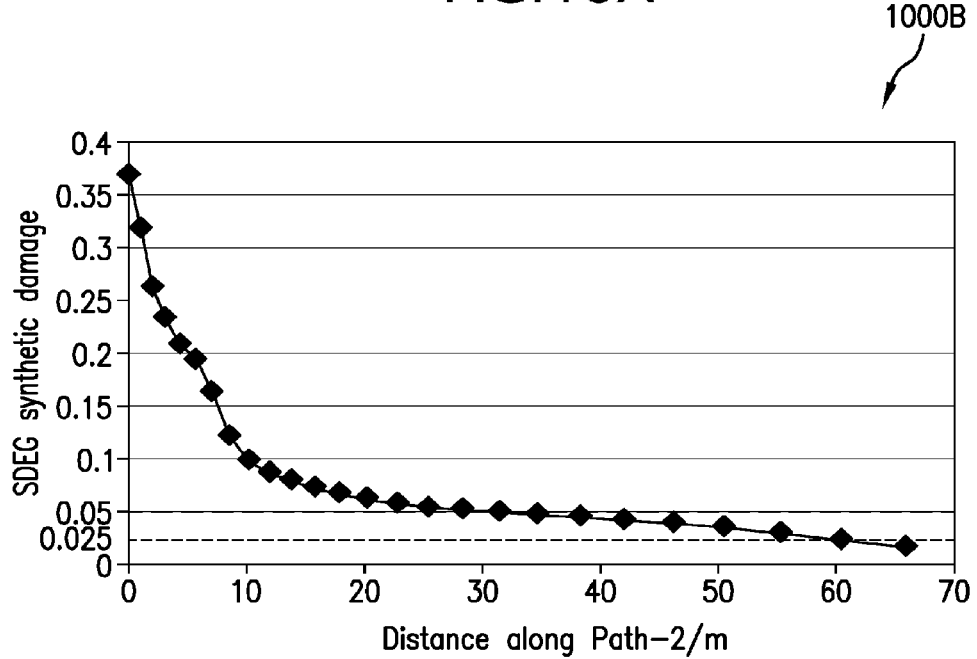

Exemplary values of the synthetic damage variable at different points (or nodes) along Path-1 and Path-2 are illustrated in FIGS. 10A and 10B, respectively. FIG. 10A shows a line graph 1000A mapping the values of the synthetic damage variable over distances along Path-1. FIG. 10B shows a line graph 1000B mapping the values of the synthetic damage variable over distances along Path-2. The line graphs in both FIGS. 10A and 10B show that the maximum value of the synthetic damage variable occurs at the point of injection and then, progressively decreases as the distance away from the injection point increases.

In an embodiment, the continuum damage distribution along Path-1, as illustrated in FIG. 10A, may be used to determine an optimal stage interval for the above-described multistage hydraulic fracturing of field 200 with the parallel horizontal wells 210 (e.g., zipper frac wells) of FIG. 2. In a further embodiment, the continuum damage distribution along Path-2, as illustrated in FIG. 10B, may be used to determine an optimal well spacing between the horizontal wells of the multistage hydraulic fracturing design for field 200. As described above, optimal values for the stage interval and well spacing may be based in part on a critical value of the synthetic damage variable that is sufficient to form an effective fracture. In an example, microseismic data captured for field 200 may be used to determine that the discontinuity index of the formation material is approximately 5%. Accordingly, the critical value of the synthetic continuum damage variable that is sufficient to form an effective fracture in field 200 is 0.05.

Thus, in order for a point along either Path-1 or Path-2 to be regarded as part of the effective fracture, the value of continuum damage variable at this point must be at least 0.05. As shown in FIG. 10A, the furthest point of effective fracture corresponding to the critical value of 0.05 along Path-1 is at a distance of approximately 24 meters from the injection point. As shown in FIG. 10B, the furthest point of effective fracture along Path-2 is at a distance of approximately 35 meters from the injection point. However, it should be noted that the furthest point of the entire fracture formed along each of Path-1 and Path-2 as a result of injection stimulation is at a much greater distance from the injection point.

Figure 11:
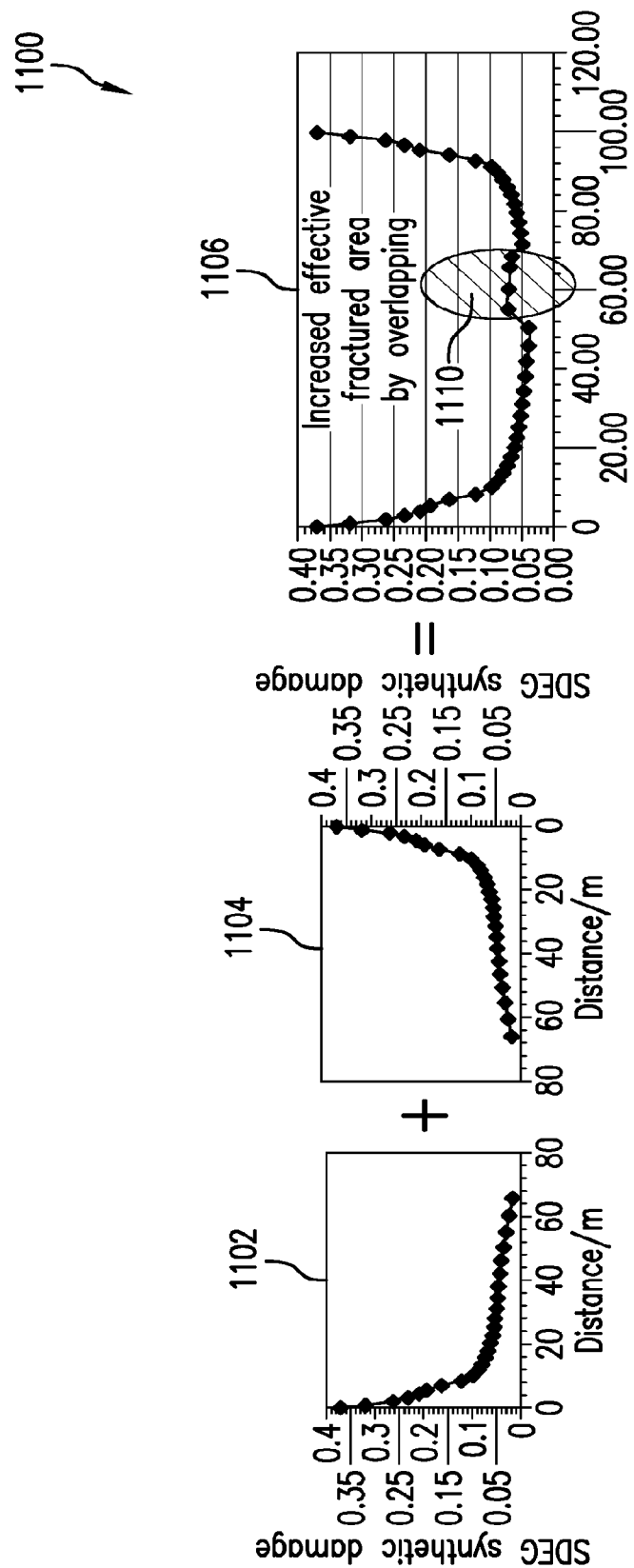
FIG. 11 illustrates an accumulated effect of overlapping two neighboring fractures.

FIG. 11 illustrates a cumulative effect of overlapping two neighboring fractures. The fractures may correspond to, for example, neighboring fracture propagation zones generated by injection stimulation. The fracture propagation zones may be generated by adjacent stimulation stages that are located either along the same horizontal well or between different neighboring wells. As shown in FIG. 11, a graph 1102 illustrates the continuum damage distribution along a selected path (e.g., Path-1 or Path-2, as described above) for a first fracture propagation zone (e.g., the leftmost fracture zone of the two neighboring zones), and a graph 1104 illustrates the continuum damage distribution along the selected path for a second fracture propagation zone (e.g., the rightmost fracture zone of the two neighboring zones). Also, as shown in FIG. 11, a graph 1106 illustrates a cumulative effect on the continuum damage distribution as a result of overlapping the fracture propagation zones. Graph 1106 shows that an increased effective fracture area 1110 may be formed between the fracture propagation zones. Area 1110 may be formed, for example, if the combined value of the synthetic damage variable resulting from the overlapping fracture zones reaches the critical value to form an effective fracture. Thus, for a critical value of 0.05, area 1110 may be formed at a location where the value of the synthetic damage variable at a point along the path of fracture propagation for each of the neighboring zones is at least half of the critical value (i.e., 0.025).

In an embodiment, it may be assumed that the continuum damage distribution for each fracture propagation zone at the same depth in the same reservoir formation may be equivalent. Thus, the determination of the point or distance away from the injection point at which the value of the synthetic damage variable reaches half of the critical value can be performed once for multiple neighboring fracture zones. This allows the analysis of the continuum damage distribution for different fracture propagation zones to be simplified. Based on this analysis, the optimized stage interval between multiple stimulation stages along the same horizontal well may be equivalent to twice the distance of the point at which the value of the synthetic damage variable along Path-1 is equivalent to half of the critical value. Thus, if the point in question is at a distance of 55 meters relative to the injection point, as shown by the example in FIG. 10A, the optimized stage interval may be 110 meters.

In an embodiment, the optimal stage interval may be used to determine the number of stages to be included in the multistage stimulation along each well. The number of stages may be equivalent to, for example, the length of the parallel horizontal well sections divided by the stage interval, as represented by the following equation: $N=L/S$, where N is the number of stages, L is the length of the well sections, and S is the stage interval. Thus, for an optimized stage interval of 110 meters, the number of stages for a horizontal well that is 400 meters in length may be determined using the above equation as follows: $N=400 \div 110=3.65$ (4, after rounding to the closest integer). Accordingly, the suggested number of stimulation stages is 4 for the multistage hydraulic fracturing design in this example.

The optimized well spacing may be determined in a similar way to the above-described technique for determining the optimized stage interval. However, the determination of the optimized well spacing involves the analysis of the continuum damage distribution along Path-2, as illustrated in FIG. 10B. Thus, the optimized well spacing between different neighboring horizontal wells may be equivalent to twice the distance of the point at which the value of the synthetic damage variable along Path-2 is equivalent to half of the critical value (e.g., 0.025). As shown in the example of FIG. 10B, the point in question is at a distance of approximately 63 meters from the injection point. Thus, the optimized well spacing may be determined to be twice this distance, or 126 meters.

Figure 12:
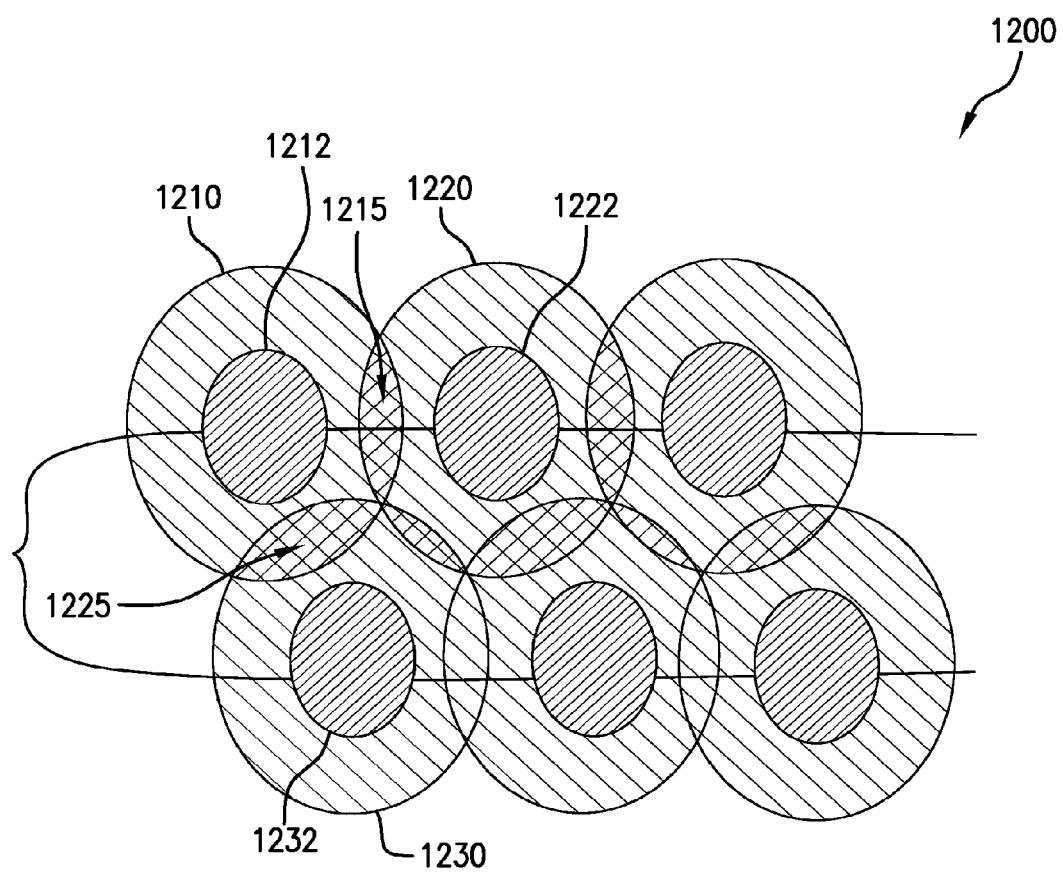
FIG. 12 illustrates an accumulated effect of overlapping fractured zones associated with two neighboring horizontal wells.

FIG. 12 illustrates the cumulative effect of overlapping neighboring fracture propagation zones generated by adjacent stimulation stages of two parallel horizontal wells, e.g., horizontal wells 210 of FIG. 2, as described above. As shown in FIG. 12, a view 1200 of the horizontal wells shows three fracture propagation zones corresponding to three stimulation stages of a multistage stimulation along each well. However, it should be noted that embodiments are not intended to be limited thereto, and that any number of stages may be used for the multistage stimulation along each well. Additionally, while only two horizontal wells are shown in FIG. 12, it should be noted that any number of horizontal wells may be used, as desired for a particular implementation.

In the example shown in FIG. 12, a fracture propagation zone 1210 and a fracture propagation zone 1220 are two neighboring fracture propagation zones generated by adjacent stimulation stages along the same horizontal well. Fracture propagation zones 1210 and 1220 include effective fracture areas 1212 and 1222, respectively, within a central region of each fracture zone. The central effective fracture areas 1212 and 1222 may represent an area of each fracture propagation zone, where the values of the synthetic damage variable are greater than or equal to the critical value (e.g., 0.05) for forming an effective fracture in the field formation, as described above. Conversely, the values of the synthetic damage variable in the area surrounding each effective fracture area may be less than this critical value. For example, this surrounding area may be a non-effective fractured region in which only microcracks have been generated after hydraulic fracturing. However, by using the optimized stage interval and optimized well spacing parameters, as described above, fracture propagation zones 1210 and 1220 may be overlapped in order to increase the total area of the effective fracture generated by multistage hydraulic fracturing. As shown in FIG. 12, overlapping the fracture propagation zones may cause an area 1215 of effective fracture to be formed between the fracture propagation zones. As described above, effective fracture area 1215 may be formed due to the summation of continuum damage values (i.e., values of the synthetic damage variable) at the edges of each fracture propagation zone. Thus, as shown in FIG. 12, the combined values of the synthetic damage variable within area 1215 between fracture propagation zones 1210 and 1220 may be greater than or equal to the critical value to form an effective fracture in the area.

Similarly, an effective fracture area 1225 may be formed between fracture propagation zone 1210 and a neighboring fracture propagation zone 1230 associated with a different horizontal well. As before, the cumulative effect of overlapping fracture propagation zones 1210 and 1230 may be to increase the value of the synthetic damage variable to be greater than or equal to the critical value. In this way, the total effective fracture area between the two fracture propagation zones may be increased beyond the central effective fracture areas 1212 and 1232 corresponding to the individual fracture propagation zones.

Figure 13:
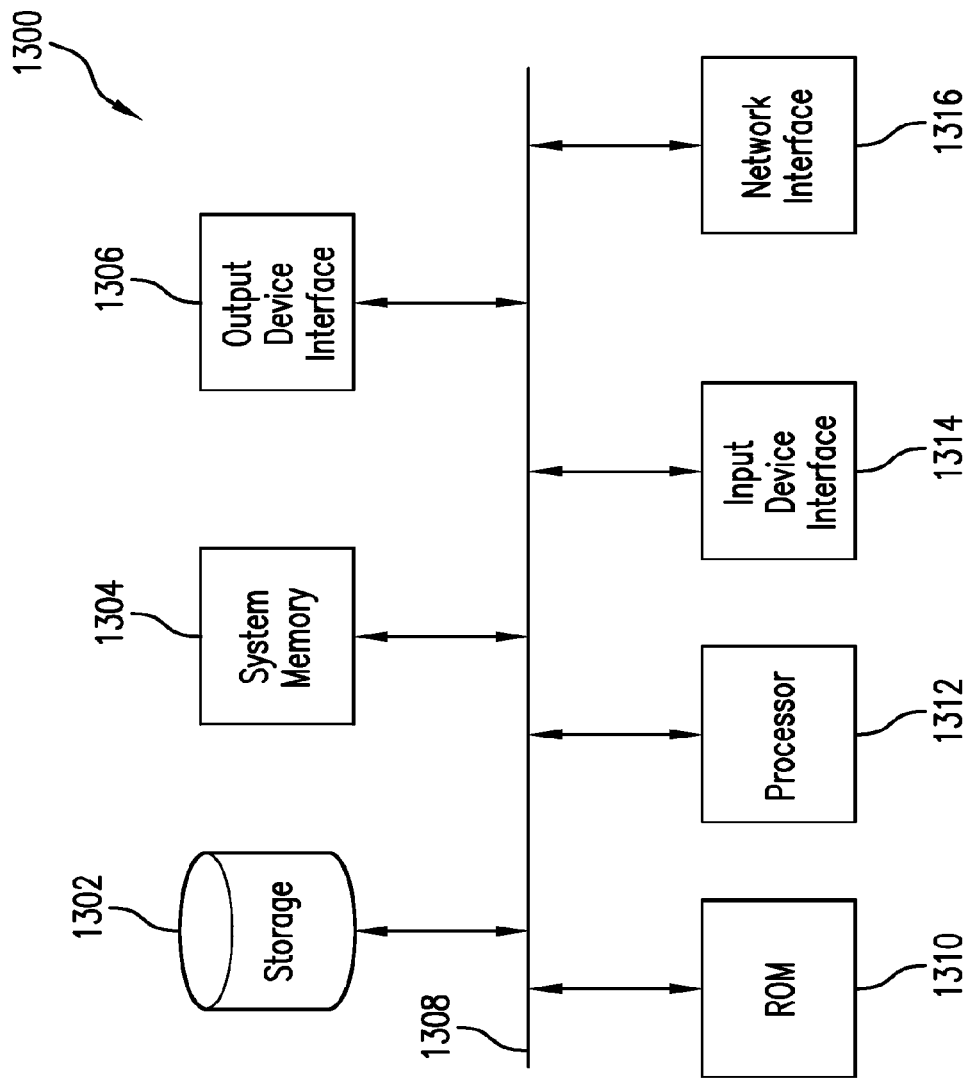
FIG. 13 is a block diagram of an exemplary computer system in which embodiments of the present disclosure may be implemented.

FIG. 13 is a block diagram of an exemplary computer system 1300 in which embodiments of the present disclosure may be implemented. For example, the steps of method 100 of FIG. 1, as described above, may be implemented using system 1300. System 1300 can be a computer, phone, PDA, or any other type of electronic device. Such an electronic device includes various types of computer readable media and interfaces for various other types of computer readable media. As shown in FIG. 13, system 1300 includes a permanent storage device 1302, a system memory 1304, an output device interface 1306, a system communications bus 1308, a read-only memory (ROM) 1310, processing unit(s) 1312, an input device interface 1314, and a network interface 1316.

Bus 1308 collectively represents all system, peripheral, and chipset buses that communicatively connect the numerous internal devices of system 1300. For instance, bus 1308 communicatively connects processing unit(s) 1312 with ROM 1310, system memory 1304, and permanent storage device 1302.

From these various memory units, processing unit(s) 1312 retrieves instructions to execute and data to process in order to execute the processes of the subject disclosure. The processing unit(s) can be a single processor or a multi-core processor in different implementations.

ROM 1310 stores static data and instructions that are needed by processing unit(s) 1312 and other modules of system 1300. Permanent storage device 1302, on the other hand, is a read-and-write memory device. This device is a non-volatile memory unit that stores instructions and data even when system 1300 is off. Some implementations of the subject disclosure use a mass-storage device (such as a magnetic or optical disk and its corresponding disk drive) as permanent storage device 1302.

Other implementations use a removable storage device (such as a floppy disk, flash drive, and its corresponding disk drive) as permanent storage device 1302. Like permanent storage device 1302, system memory 1304 is a read-and-write memory device. However, unlike storage device 1302, system memory 1304 is a volatile read-and-write memory, such a random access memory. System memory 1304 stores some of the instructions and data that the processor needs at runtime. In some implementations, the processes of the subject disclosure are stored in system memory 1304, permanent storage device 1302, and/or ROM 1310. For example, the various memory units include instructions for computer aided pipe string design based on existing string designs in accordance with some implementations. From these various memory units, processing unit(s) 1312 retrieves instructions to execute and data to process in order to execute the processes of some implementations.

Bus 1308 also connects to input and output device interfaces 1314 and 1306. Input device interface 1314 enables the user to communicate information and select commands to the system 1300. Input devices used with input device interface 1314 include, for example, alphanumeric, QWERTY, or T9 keyboards, microphones, and pointing devices (also called "cursor control devices"). Output device interfaces 1306 enables, for example, the display of images generated by the system 1300. Output devices used with output device interface 1306 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 13, bus 1308 also couples system 1300 to a public or private network (not shown) or combination of networks through a network interface 1316. Such a network may include, for example, a local area network ("LAN"), such as an Intranet, or a wide area network ("WAN"), such as the Internet. Any or all components of system 1300 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of method 100 of FIG. 1, as described above, may be implemented using system 1300 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, embodiments of the present disclosure may be used to optimize multistage hydraulic fracturing design by determining optimal design parameters based on 3D continuum damage mechanics. A proper choice of values for these two parameters may be key to obtaining a successful production of subsurface hydrocarbon deposits, particularly with respect to unconventional resources, such as oil and/or natural gas in tight sand or shale formations. By improving the accuracy of these design parameters, the disclosed techniques help to optimize the placement of neighboring wells and their stimulation stages so as to maximize hydrocarbon production. Accordingly, advantages of the present disclosure include improving the development of unconventional oil and gas resources by helping to maximize (1) the amount of production rate of oil and gas and (2) the percentage of unlocked reserves of unconventional resources within rock formations.

In one embodiment of the present disclosure, a computer-implemented method for optimizing multistage hydraulic fracturing design based on 3D continuum damage mechanics includes: generating a 3D global model of a field of hydrocarbon reservoirs based on subsurface data captured for the field; calculating values of one or more mechanical variables for the field based on a finite element analysis of the generated 3D global model; generating a smaller-scale 3D sub-model of a selected portion of the field based on the 3D global model and the calculated values of the one or more mechanical variables, where the selected portion corresponds to a formation of at least one of the field's hydrocarbon reservoirs that is targeted for fluid injection stimulation; applying one or more numerical damage models to the generated 3D sub-model to simulate hydraulic fracturing effects of the fluid injection stimulation within the targeted reservoir formation; and determining one or more optimal design parameters for multistage hydraulic fracturing of the targeted reservoir formation with a plurality of horizontal wells, based on numerical results of the simulation.

In a further embodiment, the hydraulic fracturing effects are simulated in vertical, transverse, and horizontal directions within a 3D volume of the 3D sub-model generated from the 3D global model, as described above. In yet a further embodiment, the one or more numerical damage models applied to the 3D sub-model include a plasticity-based continuum damage model applied to the 3D sub-model to stimulate the hydraulic fracturing effects at a material level of the targeted reservoir formation and a coupled poro-elastoplastic finite element model applied to the 3D sub-model to simulate the hydraulic fracturing effects at a structural level of the targeted reservoir formation as a whole. In yet a further embodiment, the one or more mechanical variables include a geo-stress distribution, a pore pressure distribution, and a displacement distribution across one or more external surfaces of the 3D global model. The one or more external surfaces may include a bottom surface and one or more lateral surfaces of the 3D global model. In yet a further embodiment, the values of the one or more mechanical variables calculated using the 3D global model are applied to the 3D sub-model as a set of boundary and initial conditions for simulating the hydraulic fracturing effects of the fluid injection stimulation within the targeted reservoir formation. The numerical results of the simulation may include continuum damage distribution values that are calculated based on the set of boundary and initial conditions applied to the 3D sub-model, where the continuum damage distribution values represent the hydraulic fracturing effects of the fluid injection stimulation within the targeted reservoir formation relative to a fluid injection point. In yet a further embodiment, the plurality of horizontal wells are drilled using a zipper frac technique involving two or more parallel horizontal wells, the multistage hydraulic fracturing includes performing a multistage stimulation along each of the two or more parallel horizontal wells, and the one or more optimal design parameters include an optimal stage interval between successive stages of the multistage stimulation in addition to an optimal well spacing between the two or more parallel horizontal wells. In yet a further embodiment, the 3D global model is generated based on subsurface data captured for the field. The subsurface data may include microseismic data obtained from stimulation of one or more offset wells drilled for the field. In yet a further embodiment, the above-described method also includes: determining a critical value for a synthetic continuum damage variable of the targeted reservoir formation based on information derived from the microseismic data, where the synthetic continuum damage variable represents the hydraulic fracturing effects resulting from compressive and tensile stresses under the fluid injection stimulation, the critical value corresponds to a value of the synthetic continuum damage variable that is sufficient to form an effective fracture within a zone of fracture propagation under the fluid injection stimulation, and the effective fracture has an opening of at least a predetermined size for holding a propping agent used in the fluid injection stimulation; and determining the optimal stage interval and the optimal well spacing based on the critical value determined for the synthetic continuum damage variable. In yet a further embodiment, the optimal stage interval is determined based on a distance of fracture propagation along a first path between a fluid injection point and a point on the first path corresponding to half of the critical value of the synthetic continuum damage variable, the first path extends in an axial direction relative to a trajectory of the two or more parallel horizontal wells, and the point on the first path represents a location between adjacent stimulation stages associated with a same one of the two or more parallel horizontal wells where a cumulative effect of overlapping fracture propagation zones allows the synthetic continuum damage variable to reach the critical value and thereby increase a total area of the effective fracture. In yet a further embodiment, the optimal well spacing is determined based on a distance of fracture propagation along a second path between the fluid injection point and a point on the second path corresponding to half of the critical value, where the second path extends in a perpendicular direction relative to the first path and the trajectory of the two or more parallel horizontal wells, and the point on the second path representing a location between optimizing a cumulative effect of overlapping fracture propagation zones between adjacent stimulation stages associated with at least two different ones of the two or more parallel horizontal wells.

In another embodiment of the present disclosure, a system for optimizing multistage hydraulic fracturing design based on 3D continuum damage mechanics comprises at least one processor and a memory including instructions stored therein, which when executed by the processor, cause the processor to perform functions including functions to: generate a 3D global model of a field of hydrocarbon reservoirs; calculate values of one or more mechanical variables for the field based on a finite element analysis of the generated 3D global model, the one or more mechanical variables including a geo-stress distribution, a pore pressure distribution, and a displacement distribution across one or more external surfaces of the 3D global model; generate a smaller-scale 3D sub-model of a selected portion of the field based on the 3D global model and the calculated values of the one or more mechanical variables, the selected portion corresponding to a formation of at least one of the field's hydrocarbon reservoirs that is targeted for fluid injection stimulation; apply one or more numerical damage models to the generated 3D sub-model to simulate hydraulic fracturing effects of the fluid injection stimulation within the targeted reservoir formation, wherein the hydraulic fracturing effects are simulated in vertical, transverse, and horizontal directions within a 3D volume of the 3D sub-model; and determine one or more optimal design parameters for multistage hydraulic fracturing of the targeted reservoir formation with a plurality of horizontal wells, based on numerical results of the simulation.

In yet another embodiment of the present disclosure, a computer-readable storage medium having instructions stored therein, which when executed by a processor cause the processor to execute functions, including functions to: generate a 3D global model of a field of hydrocarbon reservoirs; calculate values of one or more mechanical variables for the field based on a finite element analysis of the generated 3D global model; generate a smaller-scale 3D sub-model of a selected portion of the field based on the 3D global model and the calculated values of the one or more mechanical variables, the selected portion corresponding to a formation of at least one of the field's hydrocarbon reservoirs that is targeted for fluid injection stimulation; apply one or more numerical damage models to the generated 3D sub-model to simulate hydraulic fracturing effects of the fluid injection stimulation within the targeted reservoir formation; and determine one or more optimal design parameters for multistage hydraulic fracturing of the targeted reservoir formation with a plurality of horizontal wells, based on numerical results of the simulation.

Furthermore, the exemplary methodologies described herein may be implemented by a system including processing circuitry or a computer program product including instructions which, when executed by at least one processor, causes the processor to perform any of the methodology described herein.

Although various embodiments and methodologies have been shown and described, the present disclosure is not limited to such embodiments and methodologies and will be understood to include all modifications and variations as would be apparent to one skilled in the art. For example, although described in the context of a hydrocarbon reservoir application, the present disclosure is also applicable to other fields in which data is arranged in inventory trees. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method for optimizing multistage hydraulic fracturing design based on three-dimensional (3D) continuum damage mechanics, the method comprising:
generating a 3D global model of a field of hydrocarbon reservoirs, based on subsurface data captured for the field;
calculating values of one or more mechanical variables for the field based on a finite element analysis of the generated 3D global model;
generating a smaller-scale 3D sub-model of a selected portion of the field based on the 3D global model and the calculated values of the one or more mechanical variables, the selected portion corresponding to a formation of at least one of the field's hydrocarbon reservoirs that is targeted for fluid injection stimulation;
determining a critical value for a synthetic continuum damage variable of the targeted reservoir formation, based on the subsurface data for the selected portion of the field corresponding to the targeted reservoir formation, the synthetic continuum damage variable representing hydraulic fracturing effects resulting from compressive and tensile stresses under fluid injection stimulation;
applying one or more numerical damage models to the generated 3D sub-model to simulate the hydraulic fracturing effects of the fluid injection stimulation within the targeted reservoir formation;
determining one or more optimal design parameters for a multistage hydraulic fracturing of the targeted reservoir formation to be performed with a plurality of horizontal wells, based on numerical results of the simulation and the critical value of the synthetic continuum damage variable; and
performing the multistage hydraulic fracturing with the plurality of horizontal wells, based on the one or more optimal design parameters.

2. The method of claim 1, wherein the hydraulic fracturing effects are simulated in vertical, transverse, and horizontal directions within a 3D volume of the 3D sub-model.

3. The method of claim 1, wherein the one or more numerical damage models applied to the 3D sub-model include a plasticity-based continuum damage model applied to the 3D sub-model to stimulate the hydraulic fracturing effects at a material level of the targeted reservoir formation and a coupled poro-elastoplastic finite element model applied to the 3D sub-model to simulate the hydraulic fracturing effects at a structural level of the targeted reservoir formation as a whole.

4. The method of claim 1, wherein the one or more mechanical variables include a geo-stress distribution, a pore pressure distribution, and a displacement distribution across one or more external surfaces of the 3D global model.

5. The method of claim 4, wherein the one or more external surfaces include a bottom surface and one or more lateral surfaces of the 3D global model.

6. The method of claim 4, wherein the values of the one or more mechanical variables calculated using the 3D global model are applied to the 3D sub-model as a set of boundary and initial conditions for simulating the hydraulic fracturing effects of the fluid injection stimulation within the targeted reservoir formation.

7. The method of claim 6, wherein the numerical results of the simulation include continuum damage distribution values that are calculated based on the set of boundary and initial conditions applied to the 3D sub-model, the continuum damage distribution values representing the simulated hydraulic fracturing effects of the fluid injection stimulation within the targeted reservoir formation relative to a fluid injection point.

8. The method of claim 1, wherein the plurality of horizontal wells are drilled using a zipper frac technique involving two or more parallel horizontal wells, the multistage hydraulic fracturing includes performing a multistage stimulation along each of the two or more parallel horizontal wells, and the one or more optimal design parameters include an optimal stage interval between successive stages of the multistage stimulation in addition to an optimal well spacing between the two or more parallel horizontal wells.

9. The method of claim 8, wherein the subsurface data includes micro seismic data obtained from stimulation of one or more offset wells drilled for the field.

10. The method of claim 9, wherein:
the critical value for the synthetic continuum damage variable of the targeted reservoir formation is determined based on information derived from the microseismic data;
the critical value corresponds to a value of the synthetic continuum damage variable that is sufficient to form an effective fracture within a zone of fracture propagation under the fluid injection stimulation; and
the effective fracture has an opening of at least a predetermined size for holding a propping agent used in the fluid injection stimulation.

11. The method of claim 10, wherein the optimal stage interval is determined based on a distance of fracture propagation along a first path between a fluid injection point and a point on the first path corresponding to half of the critical value of the synthetic continuum damage variable, the first path extends in an axial direction relative to a trajectory of the two or more parallel horizontal wells, and the point on the first path represents a location between adjacent stimulation stages corresponding to a same one of the two or more parallel horizontal wells where a cumulative effect of overlapping fracture propagation zones formed by the adjacent stimulation stages allows the synthetic continuum damage variable to reach the critical value and thereby increase a total area of the effective fracture.

12. The method of claim 11, wherein the optimal well spacing is determined based on a distance of fracture propagation along a second path between the fluid injection point and a point on the second path corresponding to half of the critical value, the second path extends in a perpendicular direction relative to the first path and the trajectory of the two or more parallel horizontal wells, and the point on the second path represents a location between at least two different ones of the two or more parallel horizontal wells where the cumulative effect of overlapping fracture propagation zones formed by stimulation stages corresponding to the at least two different parallel horizontal wells further increases the total area of the effective fracture.

13. A system for optimizing multistage hydraulic fracturing design based on three-dimensional (3D) continuum damage mechanics, the system comprising:
at least one processor; and
a memory including instructions stored therein, which when executed by the processor, cause the processor to perform functions including functions to:
generate a 3D global model of a field of hydrocarbon reservoirs, based on subsurface data captured for the field;
calculate values of one or more mechanical variables for the field based on a finite element analysis of the generated 3D global model, the one or more mechanical variables including a geo-stress distribution, a pore pressure distribution, and a displacement distribution across one or more external surfaces of the 3D global model;
generate a smaller-scale 3D sub-model of a selected portion of the field based on the 3D global model and the calculated values of the one or more mechanical variables, the selected portion corresponding to a formation of at least one of the field's hydrocarbon reservoirs that is targeted for fluid injection stimulation;
determine a critical value for a synthetic continuum damage variable of the targeted reservoir formation, based on the subsurface data for the selected portion of the field corresponding to the targeted reservoir formation, the synthetic continuum damage variable representing hydraulic fracturing effects resulting from compressive and tensile stresses under fluid injection stimulation;
apply one or more numerical damage models to the generated 3D sub-model to simulate the hydraulic fracturing effects of the fluid injection stimulation within the targeted reservoir formation, wherein the hydraulic fracturing effects are simulated in vertical, transverse, and horizontal directions within a 3D volume of the 3D sub-model;
determine one or more optimal design parameters for a multistage hydraulic fracturing of the targeted reservoir formation to be performed with a plurality of horizontal wells, based on numerical results of the simulation and the critical value of the synthetic continuum damage variable; and
perform the multistage hydraulic fracturing with the plurality of horizontal wells, based on the one or more optimal design parameters.

14. The system of claim 13, wherein the one or more numerical damage models applied to the 3D sub-model include a plasticity-based continuum damage model applied to the 3D sub-model to stimulate the hydraulic fracturing effects at a material level of the targeted reservoir formation and a coupled poro-elastoplastic finite element model applied to the 3D sub-model to simulate the hydraulic fracturing effects at a structural level of the targeted reservoir formation as a whole.

15. The system of claim 13, wherein the values of the one or more mechanical variables calculated using the 3D global model are applied to the 3D sub-model as a set of boundary and initial conditions for simulating the hydraulic fracturing effects of the fluid injection stimulation within the targeted reservoir formation.

16. The system of claim 15, wherein the numerical results of the simulation include continuum damage distribution values that are calculated based on the set of boundary and initial conditions applied to the 3D sub-model, the continuum damage distribution values representing the simulated hydraulic fracturing effects of the fluid injection stimulation within the targeted reservoir formation relative to a fluid injection point.

17. The system of claim 13, wherein the plurality of horizontal wells are drilled using a zipper frac technique involving two or more parallel horizontal wells, the multistage hydraulic fracturing includes performing a multistage stimulation along each of the two or more parallel horizontal wells, and the one or more optimal design parameters include an optimal stage interval between successive stages of the multistage stimulation in addition to an optimal well spacing between the two or more parallel horizontal wells.

18. The system of claim 17, wherein:
the subsurface data includes microseismic data obtained from stimulation of one or more offset wells drilled for the field;
the critical value for the synthetic continuum damage variable of the targeted reservoir formation is determined based on information derived from the microseismic data;
the critical value corresponds to a value of the synthetic continuum damage variable that is sufficient to form an effective fracture within a zone of fracture propagation under the fluid injection stimulation; and
the effective fracture has an opening of at least a predetermined size for holding a propping agent used in the fluid injection stimulation.

19. The system of claim 18, wherein:
the optimal stage interval is determined based on a distance of fracture propagation along a first path between a fluid injection point and a point on the first path corresponding to half of the critical value of the synthetic continuum damage variable, the first path extending in an axial direction relative to a trajectory of the two or more parallel horizontal wells, the point on the first path representing a location between adjacent stimulation stages corresponding to a same one of the two or more parallel horizontal wells where a cumulative effect of overlapping fracture propagation zones formed by the adjacent stimulation stages allows the synthetic continuum damage variable to reach the critical value and thereby increase a total area of the effective fracture; and
the optimal well spacing is determined based on a distance of fracture propagation along a second path between the fluid injection point and a point on the second path corresponding to half of the critical value, the second path extending in a perpendicular direction relative to the first path and the trajectory of the two or more parallel horizontal wells, and the point on the second path representing a location between at least two different ones of the two or more parallel horizontal wells where the cumulative effect of overlapping fracture propagation zones formed by stimulation stages corresponding to the at least two different parallel horizontal wells further increases the total area of the effective fracture.

20. A non-transitory computer-readable storage medium having instructions stored therein, which when executed by a processor cause the processor to execute functions, including functions to:
generate a 3D global model of a field of hydrocarbon reservoirs, based on subsurface data captured for the field;
calculate values of one or more mechanical variables for the field based on a finite element analysis of the generated 3D global model;

generate a smaller-scale 3D sub-model of a selected portion of the field based on the 3D global model and the calculated values of the one or more mechanical variables, the selected portion corresponding to a formation of at least one of the field's hydrocarbon reservoirs that is targeted for fluid injection stimulation;

determine a critical value for a synthetic continuum damage variable of the targeted reservoir formation, based on the subsurface data for the selected portion of the field corresponding to the targeted reservoir formation, the synthetic continuum damage variable representing hydraulic fracturing effects resulting from compressive and tensile stresses under fluid injection stimulation;

apply one or more numerical damage models to the generated 3D sub-model to simulate the hydraulic fracturing effects of the fluid injection stimulation within the targeted reservoir formation;

determine one or more optimal design parameters for a multistage hydraulic fracturing of the targeted reservoir formation to be performed with a plurality of horizontal wells, based on numerical results of the simulation and the critical value of the synthetic continuum damage variable; and perform the multistage hydraulic fracturing with the plurality of horizontal wells, based on the one or more optimal design parameters.

* * * * *

UNITED STATES PATENT AND TRADEMARK OFFICE
CERTIFICATE OF CORRECTION

| | | |
|---|---|---|
| PATENT NO. | : 9,836,561 B2 | Page 1 of 1 |
| APPLICATION NO. | : 14/770076 | |
| DATED | : December 5, 2017 | |
| INVENTOR(S) | : Xinpu Shen, William B. Standifird and Scot Evans | |

It is certified that error appears in the above-identified patent and that said Letters Patent is hereby corrected as shown below:

In the Specification

Column 1, Line 6 add the following before the "FIELD OF THE DISCLOSURE"
-- CROSS REFERENCE TO RELATED APPLICATIONS
This application is a U.S. National Stage patent application of International Patent Application No. PCT/US2014/053171, filed on August 28, 2014, the benefit of which is claimed and the disclosure of which is incorporated herein by reference in its entirety. --

Column 4, Line 37 change "microscismic" to -- microseismic --

Column 19, Line 1 delete "For example, although described in the context of a hydrocarbon reservoir application, the present disclosure is also applicable to other fields in which data is arranged in inventory trees."

In the Claims

Column 20, Line 26 change "micro seismic" to -- microseismic --

Signed and Sealed this
Third Day of July, 2018

Andrei Iancu
*Director of the United States Patent and Trademark Office*